(12) United States Patent
Riter et al.

(10) Patent No.: US 12,189,659 B2
(45) Date of Patent: Jan. 7, 2025

(54) SYSTEMS AND METHODS FOR A MULTI-HIERARCHY PHYSICAL STORAGE ARCHITECTURE FOR MANAGING PROGRAM AND OUTCOME DATA

(71) Applicant: iDesignEDU, LLC, Dallas, TX (US)

(72) Inventors: Paxton Riter, Dallas, TX (US); Ned Stone, Dallas, TX (US); Whitney Kilgore, Valley View, TX (US); Krista Galyen, Columbia, MO (US); Sam Foster, Dallas, TX (US); Andreas Buchmann, Stuttgart (DE); Derek Howard, Columbia, MO (US)

(73) Assignee: iDesignEDU, LLC, Dallas, TX (US)

( * ) Notice: Subject to any disclaimer, the term of this patent is extended or adjusted under 35 U.S.C. 154(b) by 0 days.

(21) Appl. No.: 18/495,639

(22) Filed: Oct. 26, 2023

(65) Prior Publication Data
US 2024/0054148 A1 Feb. 15, 2024

Related U.S. Application Data

(63) Continuation of application No. 18/175,463, filed on Feb. 27, 2023, now Pat. No. 11,803,573, and a
(Continued)

(51) Int. Cl.
G06F 16/00 (2019.01)
G06F 16/22 (2019.01)
G06F 16/242 (2019.01)
G06F 16/248 (2019.01)
G06F 16/28 (2019.01)

(52) U.S. Cl.
CPC ........ *G06F 16/282* (2019.01); *G06F 16/2272* (2019.01); *G06F 16/2282* (2019.01); *G06F 16/243* (2019.01); *G06F 16/248* (2019.01)

(58) Field of Classification Search
CPC .............. G06F 16/282; G06F 16/2272; G06F 16/2282; G06F 16/243; G06F 16/248; G06F 16/211; G06F 16/2246; G06F 16/2457; G06F 16/26
See application file for complete search history.

(56) References Cited

U.S. PATENT DOCUMENTS 9,553,771 B1 1/2017 McKenna et al.
11,360,993 B1 6/2022 Prasad et al.
(Continued)

OTHER PUBLICATIONS

Attaran et al., "A Novel Technique for Object Oriented Relational Database Design", (2011), 2011 IEEE 10th International Conference on Cybernetic Intelligent Systems, Sep. 1-2, 2011, pp. 128-132, XP032136959, DOI: 10.1109/ CIS. 2011.6169147 ISBN: 978-1-4673-0687-4.

*Primary Examiner* — Paul Kim
(74) *Attorney, Agent, or Firm* — Foley & Lardner LLP

(57) ABSTRACT

In some aspects, the disclosure is directed to methods and systems for data storage and retrieval from a computer memory. A computing device may store a first hierarchical data structure having a first sequence of sub-data structures and a second hierarchical data structure having a second sequence of sub-data structures in memory. The computing device may link the first hierarchical data structure and the second hierarchical data structure together. The computing device may link the first hierarchical data structure and the second hierarchical data structure by inserting an identifier of a sub-data structure of the second sequence in the first sequence.

15 Claims, 14 Drawing Sheets

Related U.S. Application Data continuation of application No. 17/686,298, filed on Mar. 3, 2022, now Pat. No. 11,593,401.

(56) References Cited

U.S. PATENT DOCUMENTS

| | | |
|---|---|---|
| 11,397,729 B2 | 7/2022 | Muralidhar et al. |
| 11,593,401 B1 | 2/2023 | Riter et al. |
| 2002/0059289 A1 | 5/2002 | Wenegrat et al. |
| 2012/0130966 A1 | 5/2012 | Schmeink et al. |
| 2018/0046655 A1 | 2/2018 | Ward |
| 2021/0151056 A1 | 5/2021 | Trim et al. |
| 2022/0114774 A1 | 4/2022 | Rascon et al. |

FIG. 6

SYSTEMS AND METHODS FOR A MULTI-HIERARCHY PHYSICAL STORAGE ARCHITECTURE FOR MANAGING PROGRAM AND OUTCOME DATA

CROSS-REFERENCE TO RELATED APPLICATION

This application claims the benefit of priority to U.S. application Ser. No. 18/175,463, filed Feb. 27, 2023, which claims the benefit of priority to U.S. application Ser. No. 17/686,298, filed Mar. 3, 2022, the entirety of which is incorporated by reference herein.

FIELD OF THE DISCLOSURE

This disclosure generally relates to systems and methods for a physical storage architecture. In particular, this disclosure relates to systems and methods for using multiple data hierarchies to store and manage program and outcome data.

BACKGROUND OF THE DISCLOSURE

Curriculum mapping or curriculum design is a historically analog process done by faculty members and instructional designers to lay out exactly how a program, course, module, etc., relates to required standards set forth by accrediting bodies or by their own institutions. Typical methods of curriculum mapping often involve storing data for individual activities and/or outcomes in various databases or a single database. However, in doing so, it can be difficult for a processor to sort and/or retrieve meaningful data about individual programs, courses, or modules (e.g., program elements) as the processor may have to query the database(s) for each individual entry that relates to the respective elements.

SUMMARY OF THE DISCLOSURE

A processor implementing the systems and methods discussed herein overcome these technical deficiencies by providing a multi-hierarchy physical storage architecture in which data for individual programs, courses, modules, etc., are stored in separate sub-data structures of one hierarchical data structure, and data for outcomes of the programs, courses, modules, etc., are stored in sub-data structures of another hierarchical data structure. The sub-data structures of the hierarchical data structures may be linked with other sub-data structures of the same hierarchical data structure to create "sequences" of related sub-data structures. For example, a partner or organization, such as an accreditation company, can create sequences for a program that includes a sub-data structure for the program itself, sub-data structures for courses that are required to be completed to complete the program, and sub-data structures for modules that are required to be completed to complete the different courses. The sequences may also include sub-data structures for the activities that are required to be completed to complete the modules. Each of the sub-data structures may include values for attributes that characterize or otherwise describe the part of the curriculum with which the sub-data structure is associated.

The sub-data structures of a sequence may be linked together such that when the processor identifies one of the sub-data structures of the sequence based on a request, the processor can quickly identify each sub-data structure in the sequence and retrieve the data from the identified sub-data structures. Sub-data structures of the outcome hierarchical data structure may be similarly linked together. In this way, the processor may quickly and efficiently retrieve data (e.g., a time on task estimate for a program, course, and/or module) about different programs and the individual elements of the programs based on the links in the sub-data structures that store data for the programs. The processor may do so instead of searching the entire database for every activity entry that pertains to the programs.

Furthermore, a processor implementing the systems and methods discussed herein may link sequences from the curriculum hierarchical data structure with related sequences of the outcome hierarchical data structure. For example, different activities may be related to modules for which data is stored in the curriculum hierarchical data structure as well as different outcomes for which data is stored in the outcome hierarchical data structure. This may be the case, for example, when activities need to be performed to satisfy requirements for a module and/or program as well as satisfy different outcomes for the same module and/or program. Accordingly, the sub-data structures for the activities may be linked to the sub-data structures for the modules to which they pertain as well as sub-data structures for the outcomes that completing the activities satisfy to link the outcome and program sub-data structures together. Thus, the processor may quickly retrieve, correlate, and analyze data for different programs and outcomes for the programs.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIG. 6 is an example file for uploading data to a curriculum hierarchical data structure, according to some implementations;

The details of various embodiments of the methods and systems are set forth in the accompanying drawings and the description below.

DETAILED DESCRIPTION

For purposes of reading the description of the various embodiments below, the following descriptions of the sections of the specification and their respective contents may be helpful:
   Section A describes embodiments of systems and methods for implementing a multi-hierarchy physical storage architecture; and
   Section B describes a computing environment which may be useful for practicing embodiments described herein.

A. Systems and Methods for Implementing a Multi-Hierarchy Physical Storage Architecture Curriculum mapping or curriculum design is a historically analog process done by faculty members and instructional designers to lay out exactly how a program, course, module, etc., relates to required standards set forth by accrediting bodies or by their own institutions. Typical methods of curriculum mapping often involve storing data for individual activities, outcomes, and/or outcomes in various databases or a single database. Such storage can be complex as activities may be a part of multiple modules, and/or be a part of the requirements to satisfy multiple outcomes. To account for these complex storage requirements, previous systems have created a database that stores multiple entries for an activity where each entry corresponds to a different outcome, module, course, and/or program with which the activity is associated (e.g., completion of a course and/or module of a course may require completion of the activity). Activities are often associated with multiple outcomes and/or modules, and modules are often associated with multiple programs. Further, outcomes are often associated with multiple other outcomes (e.g., completion of one outcome may require completion of one or more other outcomes). Accordingly, storing the data entries for each permutation of an activity (e.g., an entry for the activity as it is required in one module, an entry for the activity as it is required in another module, etc.) can often require a significant number of entries in a database. The large volume of entries required to account for each permutation of an activity can make it difficult for a processor to sort and/or retrieve meaningful data about individual programs, courses, modules, or outcomes. This may be the case because the processor may have to query the database(s) for each individual activity entry that relates to the respective program, course, module, or outcome.

Figure 1A:
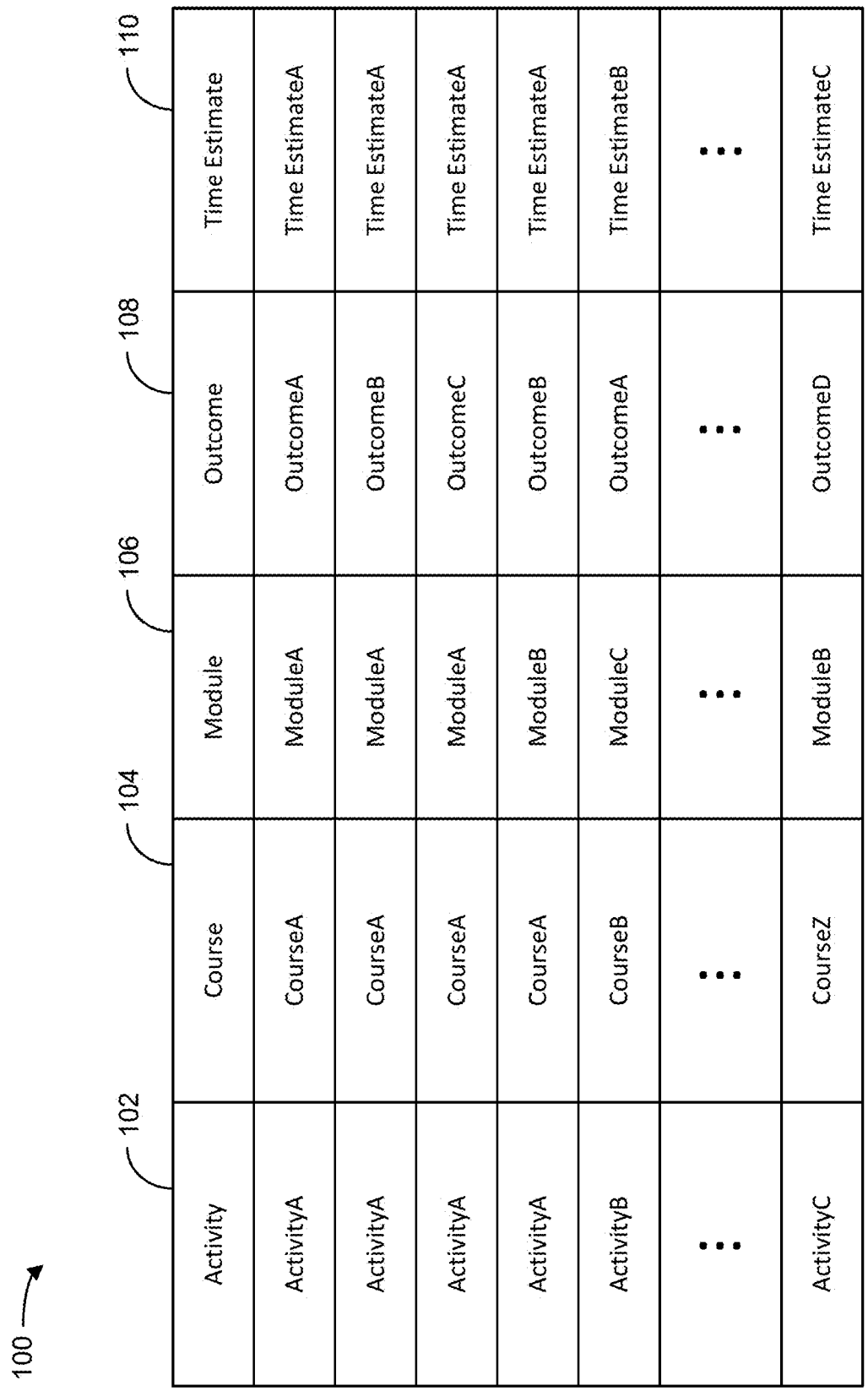
FIG. 1A is an illustration of a database storing entries for different activities of a curriculum.
Figure 1B:
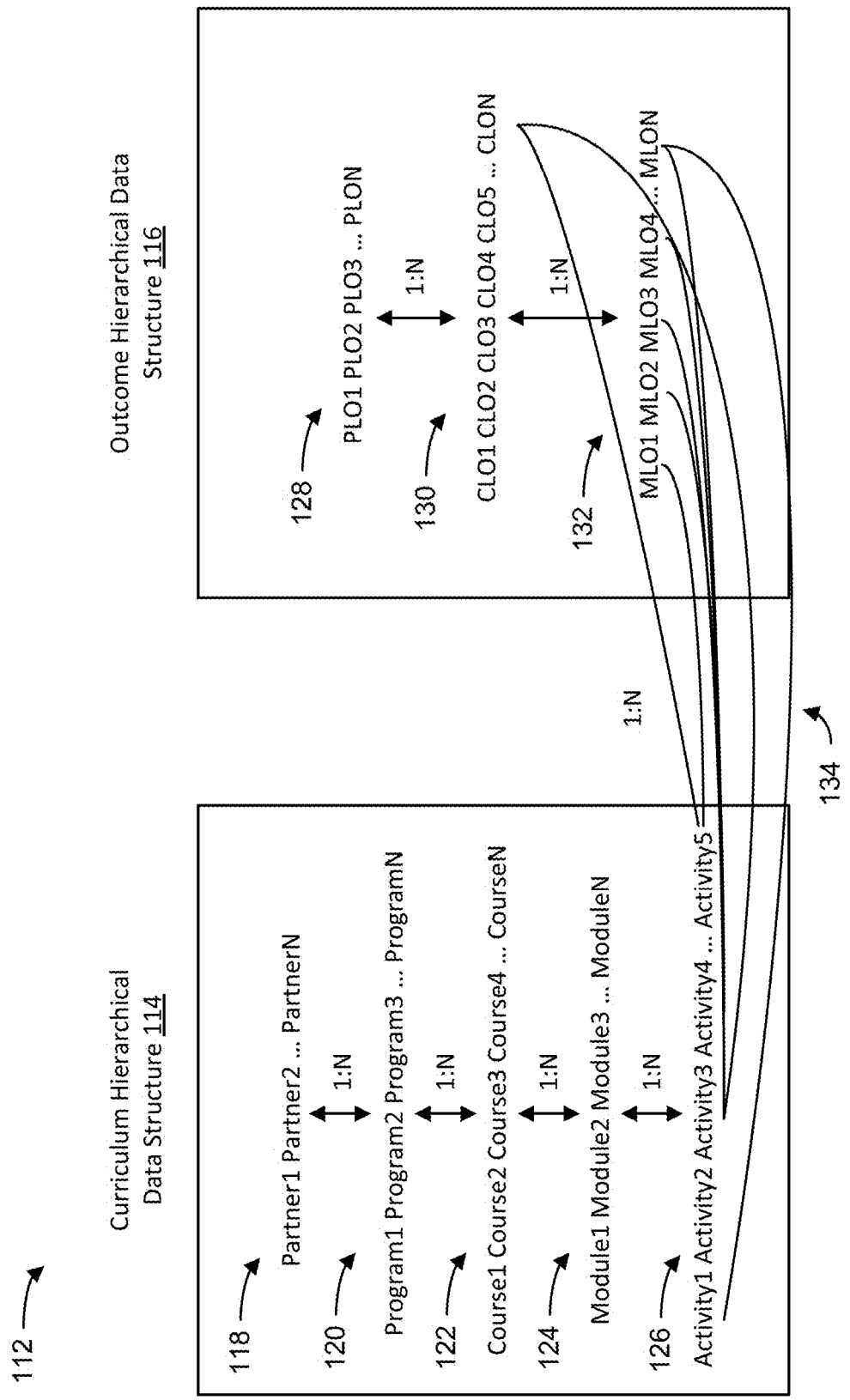
FIG. 1B is an illustration of a multi-hierarchical data structure for storing curriculum and outcome data, according to some implementations.

For example, FIG. 1 illustrates an example database 100 that includes individual entries for different permutations of activities, as such a database is implemented in systems not implementing the systems and methods discussed herein. As illustrated, database 100 may include data entries as rows for individual activities and data for the activities in different columns. The data entries may include identifiers of the activities and identifiers of the courses, modules, and outcomes that require the activities to be completed for their requirements to be satisfied. For example, database 100 may include an activity column 102 that includes identifiers of different activities. Database 100 may also include a course column 104 and a module column 106 that includes identifiers of courses and modules, respectively, that require the activity in the same row to be completed for the respective course and module to be completed. Database 100 may further include an outcome column 108, which, similar to course column 104 and module column 106, may include identifiers of outcomes that require the activity in the same row to be completed for the respective outcome to be satisfied. For example, a course may be algebra. The algebra course may have multiple modules that need to be completed for the course to be satisfied, such as point-slope form, analytical reasoning, and multi-variable algebra. In order for a student to complete the algebra course, the student must complete each or a defined subset of the modules for the course. To complete each module, the student must complete each or a defined subset of activities (e.g., reading assignments, worksheets, projects, etc.). Further, each module and course may have a defined set of outcomes that may be similarly satisfied by completing activities. Each permutation of course, module, and outcome that corresponds to an individual activity may have its own data entry in database 100. This database architecture can result in a database having hundreds of thousands of entries, particularly when database 100 stores data for multiple programs and/or partners that create programs at once, and can require a large amount of memory.

In some cases, database 100 may also include columns for data about the different activities, such as a time on task estimate or an estimated ability requirement (e.g., an estimated reading level requirement). Time estimate column 110 of database 100 illustrates an example of time on task estimate data. Because the data for the individual entries is individually associated with individual entries for activities instead of the courses, modules, and/or outcomes, if a user requests for an aggregate of the time on task estimate for a particular module or course from the computing device that stores database 100, the computing device would have to query all of database 100 to identify each entry that includes an identifier of the respective course or module and aggregate time on task estimates from the individual entries. Because of the sheer number of entries in database 100, this process can take a large amount of time and computing resources as the computing device queries each row of database 100.

Implementations of the systems and methods described herein overcome the aforementioned technical deficiencies by implementing a multi-hierarchical data structure. For example, referring now to FIG. 1B, a multi-hierarchical data structure 112 may include a curriculum hierarchical data structure 114 and an outcome hierarchical data structure 116. Curriculum hierarchical data structure 114 may include sub-data structures that respectively store data for different programs and curricula of the programs. For example, curriculum hierarchical data structure 114 may include sub-data structures for different elements of programs, such as partners 118 (e.g., companies, accreditation agencies, schools, universities, etc.), programs 120 (e.g., degrees, school subject, accreditation programs, etc.), courses 122 (e.g., classes that are required to complete respective programs), modules 124 (e.g., sections of individual courses), and/or activities 126 (e.g., activities that are required to complete the modules). The sub-data structures of curriculum hierarchical data structure 114 may each store data for different attributes of the elements such as name, type, and/or a time on task estimate. The sub-data structures for the different types of elements may be linked to sub-data structures of other types of elements of curriculum hierarchical data structure 114 to which they are related (e.g., a partner sub-data structure may be linked to a program sub-data structure if the partner of the sub-data structure created the program or is otherwise associated with the program, a program sub-data structure may be linked to a course sub-data structure if the course is required to be completed to complete the program, etc.). The sub-data structures may be linked by identifiers of the sub-data structures to which they are linked (e.g., linked sub-data structures may each store identifiers identifying and/or pointing to the other sub-data structures of the link) such that the computing device that stores curriculum hierarchical data structure 114 can quickly retrieve data about a particular sequence of linked partners, programs, courses, modules, and/or activities by identifying the pointer identifiers in the sub-data structures.

Outcome hierarchical data structure 116 may similarly include sub-data structures for different outcomes. Outcome hierarchical data structure 116 may include sub-data structures for program outcomes 128, course outcomes 130, and module outcomes 132. The sub-data structures for related outcomes may be linked in outcome hierarchical data structure 116. For example, multiple course outcomes may be required to be completed for a program outcome to be completed and multiple module outcomes may be required to be completed to complete a course outcome. The sub-data structures for the course outcomes may each include an identifier of the program outcome sub-data structure, thus linking the course outcome sub-data structure to the program outcome sub-data structure. Module outcome sub-data structures may be similarly linked to course outcome sub-data structures. Thus, similar to curriculum hierarchical data structure 114, only one sub-data structure may be required to store data for each individual module outcome, course outcome, or program outcome and still indicate which outcomes are required to be completed to complete a program outcome at the top of the hierarchy.

Furthermore, the configuration of the sub-data structures of curriculum hierarchical data structure 114 and the sub-data structures of outcome hierarchical data structure 116 may enable quicker data retrieval of data that pertains to a particular partner, program, course module, or activity. For example, a program may have multiple program outcomes that need to be completed for the program to be completed. While these outcomes may be baked into completing individual courses and/or modules, data for the individual outcomes may still need to be stored. To avoid the repetitive data storage problem of prior systems as described above, the activity sub-data structures of the activities that are required to complete the program may be linked to outcome sub-data structures in outcome hierarchical data structure 116. The activity sub-data structures may be linked (e.g., by links 134) to module or course outcome sub-data structures that require the respective activities to be satisfied for the module or course outcomes to be satisfied as well. Because the program sub-data structure for the program may be linked (e.g., linked through course and/or module sub-data structures) to the activity sub-data structures that are in turn linked to outcome sub-data structures that pertain to the program, the computer can quickly retrieve and/or generate data about the program upon receiving a request identifying the program. In one example, the computing device may receive a request identifying a program and the computing device may identify the identifiers linking the program sub-data structure for the program to the sub-data structures for the different courses, modules, activities, and/or outcomes that correspond to the program to quickly identify the courses, modules, activities that are required to complete the program and the outcomes that are also involved in completing the program. In doing, the computing device may also determine an estimate of the time it will take to complete the program and its individual sub-components and outcomes. The computing device may do so without querying an entire database for entries that include the identifier of the program, thus saving a substantial amount of time and computing resources.

Figure 2:
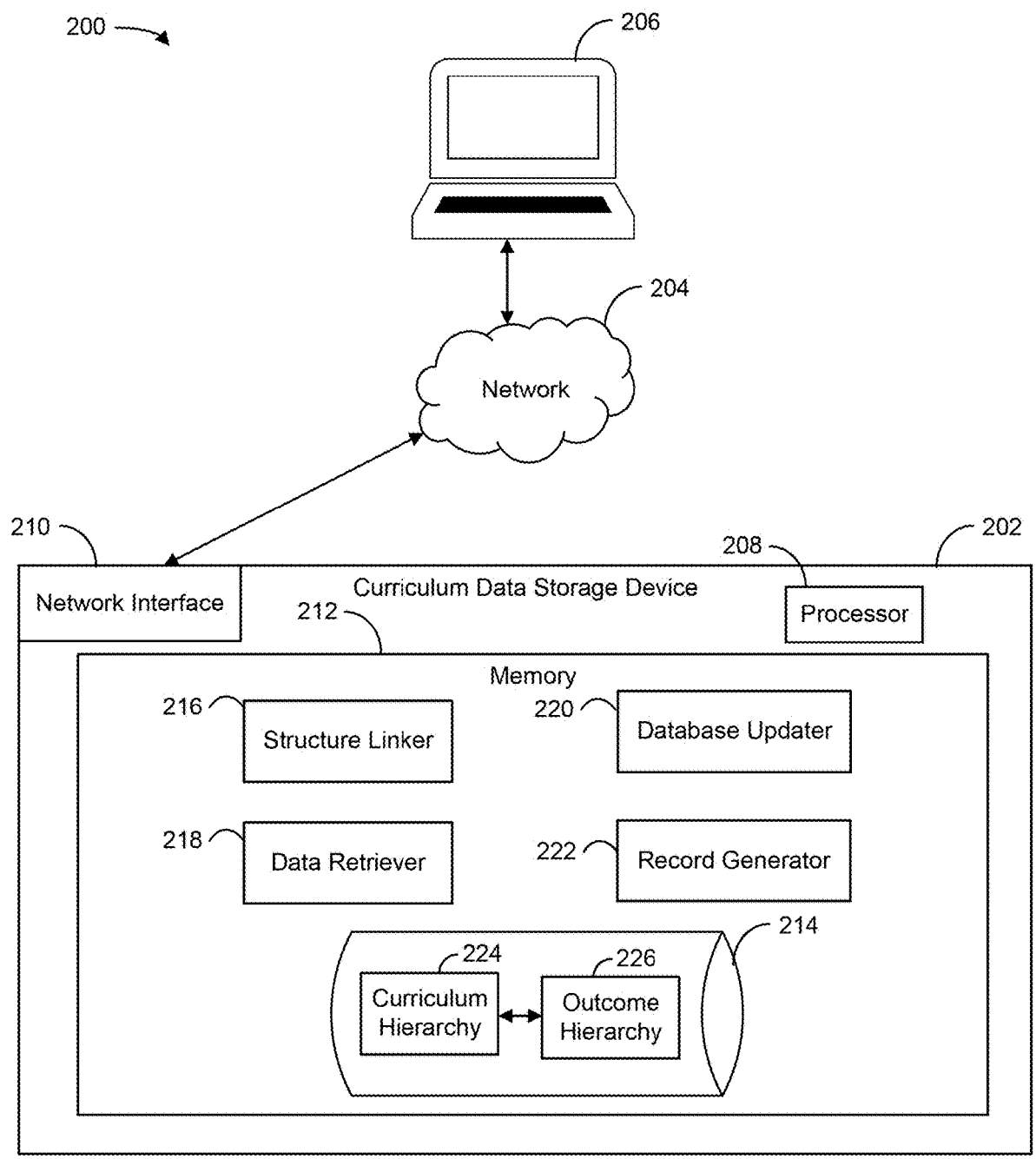
FIG. 2 is a block diagram of a system for implementing a multi-hierarchy physical storage architecture, according to some implementations.

FIG. 2 is a block diagram of a system 200 for implementing a multi-hierarchy physical storage architecture, according to some implementations. System 200 may include a curriculum data storage device 202, a network 204, and/or a computing device 206. Computing device 206 may communicate with curriculum data storage device 202 over network 204. Curriculum data storage device 202 may store curriculum data for various partners and/or programs and outcomes for such curriculum data in two hierarchical data structures. The two hierarchical data structures may be configured and linked such that curriculum data storage device 202 may quickly retrieve all of the data that is related to a particular program or an aspect of such a program in response to a request from computing device 206. Curriculum data storage device 202 may do so while minimizing the amount of memory requirements that are typically needed to store data for multiple programs, in some cases for many different organizations.

Computing device 206 may comprise any type and form of media device or computing device, including a desktop computer, laptop computer, portable computer, tablet computer, wearable computer, embedded computer, smart television, set top box, console, Internet of Things (IoT) device or smart appliance, or any other type and form of computing device. Computing device(s) may be referred to variously as a client, device, client device, computing device, anonymized computing device or any other such term. Computing devices and intermediary modulator may receive media streams via any appropriate network, including local area networks (LANs), wide area networks (WANs) such as the Internet, satellite networks, cable networks, broadband networks, fiber optic networks, microwave networks, cellular networks, wireless networks, or any combination of these or other such networks (e.g., network 204). In many implementations, the networks may include a plurality of subnetworks which may be of the same or different types, and may include a plurality of additional devices (not illustrated), including gateways, modems, firewalls, routers, switches, etc.

Curriculum data storage device 202 may comprise one or more processors 208 (including co-processors such as graphics processing unit (GPUs) or tensor processing units (TPUs)), and/or may communicate with other devices providing co-processing power (e.g. cloud-based processing units such as virtual computing devices, desktop computing devices connected via a network, etc. for performing object recognition). Curriculum data storage device 202 may also comprise one or more network interfaces 210, such as a wireless network interface (e.g. 802.11 or WiFi, cellular, or satellite network interface) and/or a wired network interface (e.g. Ethernet) for communicating with each other and/or with other computing devices via network 204, such as a Wide Area Network (WAN) such as the Internet, Local Area Network (LAN), cellular network, broadband network, peer-to-peer network, or any other type or form of network. Although not illustrated, curriculum data storage device 202 may communicate via one or more additional devices, such as gateways, switches, routers, firewalls, accelerators, load balancers, security appliances, or other such devices. Curriculum data storage device 202 may further comprise a memory 212 (e.g. flash memory, hard drives, etc.) for storing applications (e.g. operating systems, media players, web browsers, social media applications, etc.). Memory 212 may include hierarchical database 214, a structure linker 216, a data retriever 218, a database updater 220, and/or a record generator 222.

Hierarchical database 214 may be a dynamic database and include data about various programs and/or program outcomes that are input by different partners for storage as the partners develop the programs. Hierarchical database 214 can be or include a graph database, MySQL, Oracle, Microsoft SQL, PostgreSql, DB2, document store, search engine, key-value store, etc. Hierarchical database 214 may be configured to hold any amount of data and can be made up of any number of components.

Hierarchical database 214 may store a curriculum hierarchical data structure 224. Curriculum hierarchical data structure 224 may be a data structure that is dedicated to storing curriculum data for different programs (e.g., academic or accreditation programs) and requirements for completing such programs. For example, curriculum hierarchical data structure 224 may store data indicating the elements of a program. The program may include of a set of courses that each contain a certain number of designed modules. Each module may contain one or more activities. The data may also include identifications of the partners or organizations that created the respective programs.

The data elements in curriculum hierarchical data structure 224 may be divided into different sub-data structures. The sub-data structures may be models (e.g., Strapi models) that divide the data into different sub-components that are representative of the different elements of a program. For instance, curriculum hierarchical data structure 224 may include a sub-data structure for a program itself (e.g., a program sub-data structure), sub-data structures for courses that are required to complete the program (e.g., course sub-data structures), sub-data structures for modules that are required to complete the courses (e.g., module sub-data structures), and sub-data structures for activities that are required to complete the modules (e.g., activity sub-data structures). Each of the sub-data structures may include data about the element such as a string identifying the element, a string identifying a type (e.g., program, module, activity, etc.) of the element, and a general description of the element such that users viewing the model can determine what the element is and its purpose. In some implementations, the activity sub-data structures may include other data about the activities, such as, but not limited to, a time on task estimate of the activity ("Time on Task Estimate"), type of the activity (e.g. a quiz, a project, an assignment, etc.), and/or a Blooms Taxonomy level (e.g. "Level 1—Understanding").

The different sub-data structures of curriculum hierarchical data structure 224 may be linked together into a hierarchical relationship. For example, the top of the hierarchy may include an initial sub-data structure that includes data for a program. The sub-data structure for the program may be linked to one or more sub-data structures that include data for courses that need to be completed to satisfy the requirements to complete the program. Each of the course sub-data structures may be linked to sub-data structures for modules that need to be completed to complete the respective courses. Finally, each of the module sub-data structures may be linked to sub-data structures for activities that need to be completed to complete the respective modules. As described herein, the links from a program sub-data structure through the intermediate course and module sub-data structures to the terminal activity sub-data structure may be a sequence of sub-data structures that include data for a single program. Such a sequence may include or be divided into any number of sub-data structures (e.g., any number of intermediate sub-data structures) depending on the program and/or the organizational system. For instance, one system may have a further set of sub-data structures for topics that need to be completed to complete a module and/or for partners that designed the respective programs. Curriculum hierarchical data structure 224 may include any number of sequences for a single program to account for the different activities, modules, and/or courses that may need to be completed to satisfy all of the requirements of the program. Further, curriculum hierarchical data structure 224 may include similar sequences for any number of programs. As described herein, the data in curriculum hierarchical data structure 224 can be created, read, uploaded, or deleted either in a CSV file or via the editing function of a tool accessible via a user interface that is hosted and provided by curriculum data storage device.

In some implementations, structure linker 216 may link the sub-data structures of curriculum hierarchical data structure 224 by executing instructions stored in structure linker 216. Structure linker 216 may include executable instructions that, upon execution, cause processor 208 to link sub-data structures together. Structure linker 216 may link the sub-data structures of curriculum hierarchical data structure 224 by storing identifiers of the immediately preceding and/or following sub-data structure in the respective sub-data structure. For instance, curriculum hierarchical data structure 224 may store, in the sub-data structure for a program, intermediate identifiers for intermediate sub-data structures of the courses that are required to complete the program. Curriculum hierarchical data structure 224 may similarly store an initial identifier for the program's sub-data structure in the same intermediate sub-data structures. The course intermediate sub-data structures may also include identifiers for the intermediate sub-data structures of the modules that are required to complete the courses. The module intermediate sub-data structures may include identifiers of the respective course intermediate sub-data structures and/or of the terminal sub-data structures of the activities that are required to complete the modules. The identifiers for the different sub-data structures may be string pointers to the respective sub-data structure that curriculum data storage device 202 may identify or select to quickly access all of the data of a sequence between a program sub-data structure and an activity sub-data structure. Curriculum data storage device 202 may do so when querying for data from any of the sub-data structures in the sequence. In this way, upon receiving a request for data identifying an element of any sub-data structures of a sequence, curriculum data storage device 202 may quickly retrieve data from each sub-data structure of the sequence to provide data about the sequence (and any other sequences that include the sub-data structure) to the requesting computing device.

In some implementations, instead of linking the sub-data structures by storing the identifiers in the sub-data structures, structure linker 216 may store the identifiers of linked sub-data structures in a separate database. For example, curriculum data storage device 202 may store a database (not shown) that includes one or more lists of sequences of sub-data structures in curriculum hierarchical data structure 224. The sequences identified in the list may include string pointers to the respective sub-data structure such that curriculum data storage device 202 may retrieve all of the data for a particular element of a program by identifying each sequence that the sub-data structure for the element is a part of in curriculum hierarchical database 214 and retrieving data from the sub-data structures in the identified sequences. Thus, upon receiving a request identifying an element of a program, curriculum data storage device 202 may identify each sequence of sub-data structures that the element is associated with from curriculum hierarchical data structure 224, retrieve data from the sub-data structures of the sequences, and return the retrieved data to the requesting computing device.

Hierarchical database 214 may also include an outcome hierarchical data structure 226. Outcome hierarchical data structure 226 may be configured similar to curriculum hierarchical data structure 224. Outcome hierarchical data structure 226 may be a data structure that is dedicated to storing outcome data (e.g., objective data) for the different programs for which data is stored in curriculum hierarchical data structure 224. The outcome data may represent the potential desired outcomes or objectives of a program or a course, as they might relate to standards designed by a professional or accrediting body or by a college or university itself. For example, a nursing program would have to meet the standards of the Commission on Collegiate Nursing Education (CCNE), a law program would have to meet ABA accreditation standards, etc. Each university may have its own standards that it wishes to apply to its program or to a particular course, thus distinguishing its program and course from another school. An example of this could be teaching law as it would relate to a particular state bar exam, teaching nursing to include tenets of the Mercy Mission if the institution is religious, etc. As with the data in curriculum hierarchical data structure 224, the outcome data in outcome hierarchical data structure 226 can be created, read, deleted, or uploaded in a CSV file or via the editing function of a user interface.

Similar to the data division in curriculum hierarchical data structure 224, the outcome data of outcome hierarchical data structure 226 may be divided into separate sub-data structures where each sub-data structure includes outcome data for a different outcome. For instance, outcome hierarchical data structure 226 may include a sub-data structure for a program outcome, sub-data structures for course outcomes that are required to complete the program outcome, and sub-data structures for module outcomes that are required to complete the respective course outcomes. In some implementations, outcome hierarchical data structure 226 may include sub-data structures for activity outcomes that are required to complete the respective module outcomes. Each of the sub-data structures in outcome hierarchical data structure 226 may include data about the respective outcomes such as a string identifying the outcome, a string identifying a type of the outcome (e.g., program outcome, course outcome, module outcome, activity outcome, etc.), and a general description of the outcome, such that users viewing the model can determine what the outcome is and its purpose. As described herein, the program outcome sub-data structures may be initial sub-data structures of the second hierarchical data structure, the course outcome sub-data structures may be intermediate sub-data structures, and the module outcome sub-data structure may be terminal sub-data structures.

The outcome sub-data structures of outcome hierarchical data structure 226 may be linked to each other similar to how the sub-data structures of curriculum hierarchical data structure 224 are linked. For instance, outcome hierarchical data structure 226 may store, in the sub-data structure for a program outcome, intermediate identifiers for each intermediate sub-data structure of the course outcomes that are required to complete the program outcome. Outcome hierarchical data structure 226 may similarly store an initial identifier for the program outcome's initial sub-data structure in the same intermediate sub-data structures. The intermediate sub-data structures for the course outcomes may also include identifiers for the terminal sub-data structures of the module outcomes that are required to complete the course outcomes. The identifiers for the different sub-data structures may be string pointers to the respective sub-data structure such that curriculum data storage device 202 may quickly access all of the data of a sequence between the sub-data structure of a program outcome and the sub-data structure of a module outcome when querying for data for any of the sub-data structures in the sequence. In this way, upon receiving a request for data identifying an outcome of any sub-data structures of a sequence, curriculum data storage device 202 may quickly retrieve data from each sub-data structure of the sequence to provide data about the sequence (and any other sequences that include the sub-data structure) to the requesting computing device. Every outcome can be tagged to an activity from the first hierarchical data structure to illustrate what parts of a course or program achieve the desired outcomes of an accreditor or a particular institution.

As described herein, a sequence of sub-data structures may be or include a series of connected sub-data structures of one hierarchical data structure. A sequence may include an initial sub-data structure, which may be the first sub-data structure of the sequence, a terminal sub-data structure, which may be the last sub-data structure of the sequence (e.g., a sub-data structure that is not linked to a lower sub-data structure in the respective hierarchical data structure), and any number of intermediate sub-data structures (e.g., sub-data structures between the initial sub-data structure and the terminal sub-data structure in the sequence). In some implementations, the types of elements or outcomes that correspond to the initial, intermediate, and terminal sub-data structures may differ between sequences. For example, in outcome hierarchical data structure 226, the terminal sub-data structure of one sequence may correspond to (e.g., store data for) a module outcome while the terminal sub-data structure of another sequence may correspond to a course outcome. Curriculum hierarchical data structure 224 may have similarly configured sequences.

As described herein, sub-data structures may be linked to a "child" sub-data structure and/or a "parent" sub-data structure. A child sub-data structure may be a sub-data structure that is beneath and linked to a parent sub-data structure but that is "further away" from an initial sub-data structure of a sequence (e.g., a child sub-data structure may require traveling through more links to identify the initial sub-data structure of a sequence than the parent sub-data structure). In one example, a module sub-data structure may be a child sub-data structure to a course sub-data structure and a program sub-data structure may be a parent sub-data structure to the course sub-data structure when the program sub-data structure is the initial sub-data structure of a sequence including each of the sub-data structures.

Structure linker 216 may link related sequences between curriculum hierarchical data structure 224 and outcome hierarchical data structure 226 together. Structure linker 216 may link sequences together that correspond to the same program. For example, structure linker 216 may link a sequence for a program from the curriculum hierarchical data structure to a sequence of outcomes for the program from the outcome hierarchical data structure. To do so, structure linker 216 may link the terminal sub-data structure (e.g., an activity sub-data structure) of the sequence for the program from curriculum hierarchical data structure 224 to the terminal sub-data structure (e.g., a module outcome sub-data structure) of a sequence corresponding to outcomes for the program from outcome hierarchical data structure 226. As described herein, the terminal sub-data structure in outcome hierarchical data structure 226 may be associated with an objective and may be an objective sub-data structure. The structure linker 216 may link sequences from the two hierarchical data structures 230 and 232 by "tagging" the terminal sub-data structure of the sequence from curriculum hierarchical data structure 224 with an identifier of the terminal sub-data structure of the sequence from outcome hierarchical data structure 226.

For example, to link the sequences from the two sub-data structures 230 and 232, structure linker 216 (or an administrator) may identify the terminal sub-data structure of the curriculum sequence and determine which of the sub-data structures of the corresponding sequence in outcome hierarchical data structure 226 does not have any "children sub-data structures." For example, curriculum data storage device 202 may receive a request to link a sequence of sub-data structures for a program from curriculum hierarchical data structure 224 with a sequence of sub-data structures for outcomes of the program from outcome hierarchical data structure 226. The request may include identifiers of different outcomes for the program. Structure linker 216 may identify an outcome sub-data structure in outcome hierarchical data structure 226 that has a matching string to one of the identifications. Structure linker 216 may extract the data from the identified sub-data structure. If the sub-data structure has an identifier for a child sub-data structure, structure linker 216 may identify the child sub-data structure. Structure linker 216 may identify the child sub-data structure based on the identifier for the child sub-data structure. Structure linker 216 may iteratively repeat these steps until structure linker 216 identifies a sub-data structure that does not have a child sub-data structure.

Upon identifying an outcome sub-data structure without a child sub-data structure (e.g., a terminal sub-data structure), structure linker 216 may link the terminal sub-data structure of curriculum hierarchical data structure 224 with the identified outcome sub-data structure without a child sub-data structure. To do so, in some implementations, structure linker 216 may insert (or tag) an identifier of the terminal outcome sub-data structure to the terminal sub-data structure of curriculum hierarchical data structure 224. In doing so, structure linker 216 may add the identifier to a field of the terminal sub-data structure in curriculum hierarchical data structure 224 and/or the terminal sub-data structure in the outcome hierarchical data structure 226 that is dedicated to storing identifiers of sub-data structures. In some implementations, instead of inserting the identifier into the sub-data structure of curriculum hierarchical data structure 224, structure linker 216 may insert the identifier into another database with an identifier of the terminal sub-data structure of curriculum hierarchical data structure 224, thus creating a pair of linked identifiers.

In some implementations, structure linker 216 may identify the terminal sub-data structure of the sequence of outcome hierarchical data structure 226 based on a user input. For example, a user viewing a visual representation of an activity sub-data structure in curriculum hierarchical data structure 224 may input an identifier of an outcome sub-data structure in outcome hierarchical data structure 226 to link the two sub-data structures together. The user may do so after determining the outcome sub-data structure is the last sub-data structure of a sequence in outcome hierarchical data structure 226. Upon receiving the input, structure linker 216 may add the input identifier into the terminal sub-data structure of curriculum hierarchical data structure 224. Structure linker 216 may similarly link any number of sequences of sub-data structures between curriculum hierarchical data structure 224 and outcome hierarchical data structure 226.

In some implementations, the sequences of curriculum hierarchical data structure 224 and/or outcome hierarchical data structure may have overlapping sub-data structures. This may be the case when one of the sub-data structures of curriculum hierarchical data structure 224 has more than one child and/or parent sub-data structure and there are therefore multiple paths through the respective sub-data structure from an initial sub-data structure to a terminal sub-data structure. For example, a course sub-data structure may be linked to a program sub-data structure and multiple module sub-data structures. The module sub-data structures may each be linked to different activity sub-data structures. In this example, there may be multiple sequences for the program sub-data structure through the course sub-data structure, through the different module sub-data structures, and/or through the activity sub-data structures. Advantageously, if curriculum data storage device 202 receives a request for data about the course, curriculum data storage device 202 may identify each sequence of sub-data structures that includes the course sub-data structures for the course and retrieve data from the sub-data structures in each sequence. The sequences of outcome hierarchical data structure 226 may similarly have multiple sequences that include common sub-data structures.

In some implementations, sequences in curriculum hierarchical data structure 224 may be linked to multiple sequences in outcome hierarchical data structure 226. For example, an activity sub-data structure in curriculum hierarchical data structure 224 may be linked to multiple outcome sub-data structures in outcome hierarchical data structure 226. This may be the case, for example, if completing an activity completes or is a part of completing multiple outcomes of outcome hierarchical data structure 226. By linking individual sequences in curriculum hierarchical data structure 224 to multiple sequences in outcome hierarchical data structure 226, curriculum data storage device 202 may be able to quickly retrieve relevant data from each hierarchical data structure in response to receiving a request that only identifies a single sub-data structure.

Curriculum data storage device 202 may receive a request for data from a sub-data structure. Curriculum data storage device 202 may receive the request from computing device 206 over network 204. The request may be, for example, a request for data about a program that has been established by a school and the outcomes that are involved in completing the program. The request may only include an identifier of the program. Curriculum data storage device 202 may receive requests for any element of a program (e.g., the program itself, a course of the program, a module of the course, an activity of the module) or any outcomes that are involved in completing such elements.

Data retriever 218 may include executable instructions that, upon execution, cause processor 208 to query hierarchical database 214 for data. In some implementations, data retriever 218 may identify the hierarchical data structure to search for data that matches the request. Data retriever 218 may do so by identifying whether the request is for data about an outcome or a request for data about an element of a program. Data retriever 218 may do so, for example, by identifying characters in the request and determining if the characters include the string "objective" or "outcome" or if the characters include the string "program," "course," "module," or "activity." If data retriever 218 identifies either of the strings objective or outcome, data retriever 218 may identify outcome hierarchical data structure 226. If data retriever 218 identifies any of the strings program, course, module, or activity, data retriever 218 may identify curriculum hierarchical data structure 224. Data retriever 218 may identify either hierarchical data structure based on any predefined string. In some implementations, the request may include an identifier of the hierarchical data structure itself. In this case, data retriever 218 may identify the hierarchical data structure based on the identifier. If data retriever 218 is not able to identify a hierarchical data structure based on the request, data retriever 218 may transmit an error message to the requesting computing device.

Upon identifying a hierarchical data structure based on a request, data retriever 218 may determine if any sub-data structures in the hierarchical data structure include a string that matches an identifier included in the request. For example, data retriever 218 may identify curriculum hierarchical data structure 224 for the request based on the request including an identifier for the hierarchical data structure. Data retriever 218 may identify a "CourseC" string in the request and search curriculum hierarchical data structure 224 for a sub-data structure that includes a matching CourseC string. If data retriever 218 is not able to identify any matching strings, data retriever 218 may generate and transmit an error notification to the requesting client device indicating that no match could be found. Otherwise, data retriever 218 may identify the sub-data structure that includes a matching string.

After identifying the sub-data structure that includes the matching string, data retriever 218 may identify the terminal sub-data structure of a sequence that includes the identified sub-data structure. For example, after identifying the sub-data structure for which data is being requested, data retriever 218 may identify each sub-data structure that is in a sequence that includes the sub-data structure. Data retriever 218 may identify the terminal sub-data structure of the sequence as the sequence that does not include an identifier of a child sub-data structure in the hierarchical data structure. Data retriever 218 may identify terminal sub-data structures for each sequence that the sub-data structure is a part of.

Data retriever 218 may determine if the terminal sub-data structure of the identified sequence is linked to the terminal sub-data structure in the other hierarchical data structure. Data retriever 218 may do so by extracting the data in the terminal sub-data structure and determining if the extracted data includes an identifier of a terminal sub-data structure in the other hierarchical data structure or by searching an external database for a link between the terminal sub-data structure in the first sequence and a terminal sub-data structure in the other hierarchical data structure.

If data retriever 218 is able to identify a matching identifier with a sequence in the other hierarchical data structure, data retriever 218 may identify each of the sequences that the other terminal sub-data structure is a part of. Data retriever 218 may retrieve data from the sequence including the sub-data structure with a string that matches the request and the sequences in the other hierarchical data structure that are linked to the sequence. If data retriever 218 is not able to identify a matching identifier, data retriever 218 may identify the sub-data structures in the sequences of the hierarchical data structure that include the sub-data structure without identifying any sub-data structures in the other hierarchical data structure. Data retriever 218 may retrieve data from the sub-data structures that are in sequences that include the sub-data structure or that are otherwise linked to such sequences.

In some implementations, user may upload data files to update curriculum hierarchical data structure 224 and outcome hierarchical data structure 226. For example, curriculum data storage device 202 may receive a data file from computing device 206. In some implementations, curriculum data storage device 202 may receive the data file after a user accessing computing device 206 provides an input identifying a type (e.g., program or outcome) of the data file. For instance, curriculum data storage device 202 may provide a hosted application to computing device 206 that includes a data import option at a user interface. A user accessing computing device 206 may select the data import option, select a type of file being uploaded, and upload the data file to curriculum data storage device 202 through the user interface.

The data file may include different types of data depending on its data type. For example, if the data file includes data for a program, the data file may include data for an institution that created or is otherwise associated with the program, a program name, a course number, a course name, a module name, an activity name, an activity type, Blooms Taxonomy, and/or a time on task estimate. If the data file includes data for an outcome, the data file may include data for a mapping type, a mapping alias, a program learning outcome, a course learning outcome, and/or a module learning outcome. The different types of data files may include any type of data.

Upon receiving the data file, database updater 220 of curriculum data storage device may identify a hierarchical data structure that corresponds to the data file. Database updater 220 may include executable instructions that, upon execution, cause processor 208 to update hierarchical database 214. Database updater 220 may identify curriculum hierarchical data structure 224 or outcome hierarchical data structure 226 based on the type of data file that was input by the user. For example, if the user selected a program type at the user interface, database updater 220 may identify curriculum hierarchical data structure 224. If the user selected an outcome type at the user interface, database updater 220 may identify outcome hierarchical data structure 226. Such identification may enable curriculum data storage device 202 to store the data in sub-data structures of the correct hierarchical data structures to facilitate the data storage and retrieval improvements described herein.

If database updater 220 determines the data is for curriculum hierarchical data structure 224, database updater 220 may update curriculum hierarchical data structure 224 with the data in the file. Database updater 220 may update curriculum hierarchical data structure 224 by either adding data to existing sub-data structures or by generating new sub-data structures in curriculum hierarchical data structure 224. For example, upon receiving an uploaded data file and identifying curriculum hierarchical data structure 224, database updater 220 may search curriculum hierarchical data structure 224 for sub-data structures that store data for the same program elements that are included in the data file. If database updater 220 identifies any sub-data structures that match strings in the data file, database updater 220 may extract data from the data file and insert the data in the matching sub-data structures. However, if database updater 220 is not able to identify any matching sub-data structures for an element in the data file, database updater 220 may instead generate a new sub-data structure for the element and link the new sub-data structure to the other existing or newly generated sub-data structures in curriculum hierarchical data structure 224 based on the links (e.g., stored relationships, such as being a part of the same row) in the data file. If database updater 220 determines the data is for outcome hierarchical data structure 226, database updater 220 may add data to outcome hierarchical data structure 226 (e.g., add data to existing sub-data structures or generate new sub-data structures) similar to how database updater 220 adds data to curriculum hierarchical data structure 224.

In some instances, curriculum data storage device 202 may receive a data request from computing device 206 over network 204. The data request may be a request for information about a particular element of a program or a particular outcome and include an identifier of the element or outcome. In some implementations, the request may also include a type of data being requested, such as an estimated time it will take to complete the element, a list of items that need to be completed to complete the outcome or element, the program with which the element is associated, an estimate of the total time it will take to complete an element of a child sub-data structure, a percentage of time spent on a child element in comparison to a parent element, a count of elements with which a child sub-data structure is linked, etc.

In response to the curriculum data storage device 202 receiving the request, data retriever 218 may identify the sub-data structure that corresponds to the program element or outcome identified in the request. Data retriever 218 may identify the sub-data structure by identifying the string of the program element or outcome identifier in the request and comparing the string to the respective hierarchical data structure (e.g., if the request is for a program element, data retriever 218 may compare the string to curriculum hierarchical data structure 224, and if the request is for an outcome, data retriever 218 may compare the string to outcome hierarchical data structure 226). Data retriever 218 may identify the sub-data structure that includes a string that matches the identifier.

In some implementations, data retriever 218 may additionally identify the sub-data structures with which the identified sub-data structure is in a sequence. For example, if the request includes an identifier of a course and the course is a part of multiple sequences within curriculum hierarchical data structure 224, data retriever 218 may identify each of the sub-data structures in the different sequences.

In some implementations, data retriever 218 may further identify sequences of sub-data structures in the other hierarchical data structure with which the sub-data structure is linked. For example, data retriever 218 may identify the terminal sub-data structures of the sequences that include the sub-data structure identified based on the request from curriculum hierarchical data structure 224. Data retriever 218 may then identify any links between the terminal sub-data structures from curriculum hierarchical data structure 224 and terminal sub-data structures in outcome hierarchical data structure 226. Data retriever 218 may identify the sequences of sub-data structures that include the terminal sub-data structures from each hierarchical data structure and identify the sub-data structures in the sequences.

Data retriever 218 may retrieve data from the identified sequences of sub-data structures. Data retriever 218 may retrieve data based on the request. For example, if the request is for a time on task estimate of a course, data retriever 218 may retrieve activity time on task estimate data from each activity that is linked (either directly or indirectly through a module) to the course. If the request is to determine a percentage of time an activity takes to complete compared to other activities that are linked to the same module, data retriever 218 may retrieve the activity time on task of each activity that is linked to the module and calculate a percentage time on task for the requested activity. If the request is for a list of elements and outcomes that are all associated with the same program, data retriever 218 may retrieve the strings identifying the names of each element and outcome from the sub-data structures in the sequences that are associated with the program (e.g., the program sub-data structure is a part of the sequence in curriculum hierarchical data structure 224 or the program sub-data structure is linked to a sequence of sub-data structures in outcome hierarchical data structure 226). Curriculum data storage device 202 may retrieve any subset of data from such sub-data structures depending on the request.

Upon retrieving the data, record generator 222 of curriculum data storage device 202 may aggregate and generate a record (e.g., a file, document, table, listing, message, notification, etc.) with the data according to the request. Record generator 222 may include executable instructions that, upon execution, cause processor 208 to update, aggregate, and generate a record of data. Record generator 222 may generate the record by aggregating the requested data into a particular format. The particular format may depend on the type of data that was requested. For example, if the request was for a list of sub-data structures, record generator 222 may generate a list from the retrieved data. If the request was for a comparison of data between different elements, record generator 222 may aggregate the data (e.g., a time on task estimate for two different modules) and generate a graph or table that illustrates the comparison. Record generator 222 may generate a record in response to any type of request for data. Record generator 222 may transmit the record to computing device 206 over network 204. In some implementations, in cases in which record generator 222 manipulates the data (e.g., creates a comparison graph or aggregates the data), record generator 222 may transmit the manipulated data with the raw data itself to provide an overview and context for the data.

Figure 3:
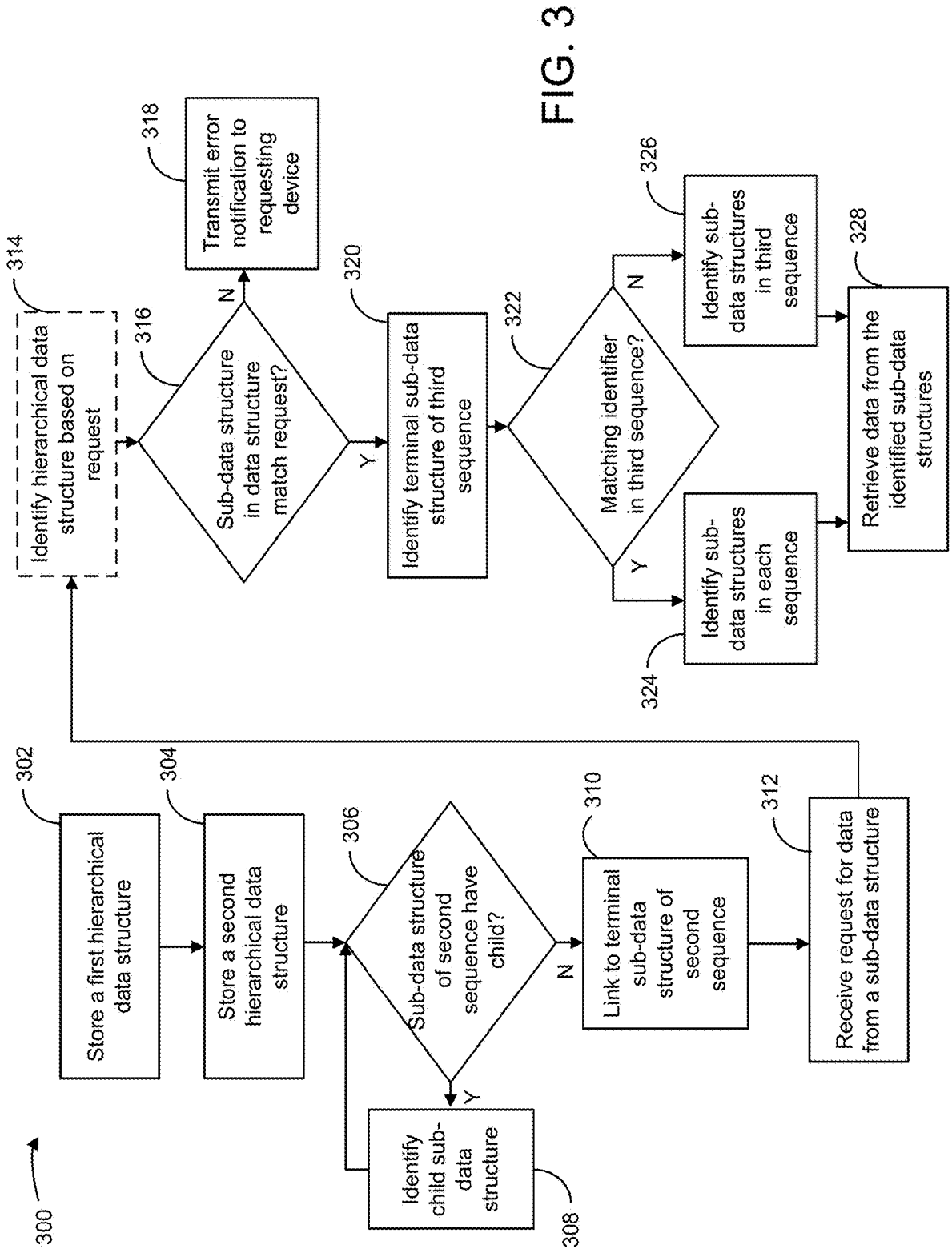
FIG. 3 is a flow chart of an implementation of a method for implementing a multi-hierarchy physical storage architecture, according to some implementations.

FIG. 3 is a flow chart of an implementation of a method 300 for implementing a multi-hierarchy physical storage architecture, according to some implementations. Method 300 may be performed by a data processing system (e.g., curriculum data storage device 202, shown and described with reference to FIG. 2). Performance of method 300 may enable the data processing system to store curriculum data for different organizations and programs in a manner that enables efficient use of memory and quick data retrieval, thus allowing the data processing system to operate faster and store data for other applications. Method 300 may include any number of steps and the steps may be performed in any order.

At step 302, the data processing system may store a first hierarchical data structure. The first hierarchical data structure may be a data structure that is dedicated to storing curriculum data for different programs (e.g., academic or accreditation programs) and requirements for completing such programs. For example, the first hierarchical data structure may store data indicating the elements of a program, such that the program is comprised of a set of courses that each contain a certain number of designed modules. Each module may contain one or more activities. The data may also include identifications of the partners or organizations that created the respective programs.

The data elements in the first hierarchical data structure may be divided into different sub-data structures. The sub-data structures may be models (e.g., Strapi models) that divide the data into different sub-components that are representative of the different elements of a program. For instance, the first hierarchical data structure may include a sub-data structure for the program itself (e.g., program sub-data structures), sub-data structures for courses that are required to complete the program (e.g., course sub-data structures), sub-data structures for modules that are required to complete the courses (e.g., module sub-data structures), and sub-data structures for activities that are required to complete the modules (e.g., activity sub-data structures). Each of the sub-data structures may include data about the element such as a string identifying the element, a string identifying a type (e.g., program, module, activity, etc.) of the element, and a general description of the element such that users viewing the model can determine what the element is and its purpose. In some implementations, the activity sub-data structures may include other data about the activities, such as, but not limited to, a time on task estimate of the activity ("Time on Task Estimate"), type of the activity (e.g. a quiz, a project, an assignment, etc.), and/or a Blooms Taxonomy level (e.g. "Level 1—Understanding").

The different sub-data structures of the first hierarchical data structure may be linked together into a hierarchical relationship. For example, the top of the hierarchy may include an initial sub-data structure that includes data for a program. The sub-data structure for the program may be linked to one or more sub-data structures that include data for courses that need to be completed to satisfy the requirements to complete the program. Each of the course sub-data structures may be linked to sub-data structures for modules that need to be completed to complete the respective courses. Finally, each of the module sub-data structures may be linked to sub-data structures for activities that need to be completed to complete the respective modules. As described herein, the links from a program sub-data structure through the intermediate course and module sub-data structures to the terminal activity sub-data structure may be a sequence of sub-data structures that include data for a single program. Such a sequence may include or be divided into any number of sub-data structures (e.g., any number of intermediate sub-data structures) depending on the program and/or the organizational system. For instance, one system may have a further set of sub-data structures for topics that need to be completed to complete a module and/or for partners that designed the respective programs. The first hierarchical data structure may include any number of sequences for a single program to account for the different activities, modules, and/or courses that may need to be completed to satisfy all of the requirements of the program. Further, the first hierarchical data structure may include similar sequences for any number of programs. As described herein, the data in the first hierarchical data structure can be created, read, uploaded, or deleted either in a CSV file or via the editing function of a tool accessible via a user interface that is hosted and provided by the data processing system.

In some implementations, the data processing system may link the sub-data structures of the first hierarchical data structure by storing identifiers of the immediately preceding and/or following sub-data structure in the respective sub-data structure. For instance, the data processing system may store, in the sub-data structure for a program, intermediate identifiers for intermediate sub-data structures of the courses that are required to complete the program. The data processing system may similarly store an initial identifier for the program's sub-data structure in the same intermediate sub-data structures. The course intermediate sub-data structures may also include identifiers for the intermediate sub-data structures of the modules that are required to complete the courses. The module intermediate sub-data structures may include identifiers of the respective course intermediate sub-data structures and/or of the terminal sub-data structures of the activities that are required to complete the modules. The identifiers for the different sub-data structures may be string pointers to the respective sub-data structure that the data processing system may identify or select to quickly access all of the data of a sequence between a program sub-data structure and an activity sub-data structure. The data processing system may do so when querying for data for any of the sub-data structures in the sequence. In this way, upon receiving a request for data identifying an element of any sub-data structures of a sequence, the data processing system may quickly retrieve data from each sub-data structure of the sequence to provide data about the sequence (and any other sequences that include the sub-data structure) to the requesting computing device.

In some implementations, instead of linking the sub-data structures by storing the identifiers in the sub-data structures, the data processing system may store the identifiers of linked sub-data structures in a separate database. For example, the data processing system may store a database that includes one or more lists of sequences of sub-data structures in the first hierarchical data structure. The sequences identified in the list may include string pointers to the respective sub-data structure such that the data processing system may retrieve all of the data for a particular element of a program by identifying each sequence that the sub-data structure for the element is a part of in the database and retrieving data from the sub-data structures in the identified sequences. Thus, upon receiving a request identifying an element of a program, the data processing system may identify each sequence of sub-data structures that the element is associated with from the database of sequences, retrieve data from the sub-data structures of the sequences, and return the retrieved data to the requesting computing device.

At step 304, the data processing system may store a second hierarchical data structure. The second hierarchical data structure may be a data structure that is dedicated to storing outcome data (e.g., objective data) for the different programs for which data is stored in the first hierarchical data structure. The outcome data may represent the potential desired outcomes or objectives of a program or a course, as they might relate to standards designed by a professional or accrediting body or by a college or university itself. For example, a nursing program would have to meet the standards of the Commission on Collegiate Nursing Education (CCNE), a law program would have to meet ABA accreditation standards, etc. Each university may have its own standards that it wishes to apply to its program or to a particular course, thus distinguishing its program and course from another school. An example of this could be teaching law as it would relate to a particular state bar exam, teaching nursing to include tenets of the Mercy Mission if the institution is religious, etc. As with the data in the first hierarchical data structure, the outcome data in the second hierarchical data structure can be created, read, deleted, or uploaded in a CSV file or via the editing function of a user interface.

Similar to the data division in the first hierarchical data structure, the outcome data of the second hierarchical data structure may be divided into separate sub-data structures where each sub-data structure includes outcome data for a different outcome. For instance, the second hierarchical data structure may include a sub-data structure for a program outcome, sub-data structures for course outcomes that are required to complete the program outcome, and sub-data structures for module outcomes that are required to complete the respective course outcomes. In some implementations, the second hierarchical data structure may include sub-data structures for activity outcomes that are required to complete the respective module outcomes. Each of the sub-data structures in the second hierarchical data structure may include data about the respective outcomes such as a string identifying the outcome, a string identifying a type of the outcome (e.g., program outcome, course outcome, module outcome, activity outcome, etc.), and a general description of the outcome, such that users viewing the model can determine what the outcome is and its purpose.

The outcome sub-data structures of the second hierarchical data structure may be linked to each other similar to how the sub-data structures of the first hierarchical data structure are linked. For instance, the data processing system may store, in the sub-data structure for a program outcome, intermediate identifiers for each intermediate sub-data structure of the course outcomes that are required to complete the program outcome. The data processing system may similarly store an initial identifier for the program outcome's initial sub-data structure in the same intermediate sub-data structures. The intermediate sub-data structures for the course outcomes may also include identifiers for the terminal sub-data structures of the module outcomes that are required to complete the course outcomes. The identifiers for the different sub-data structures may be string pointers to the respective sub-data structure such that the data processing system may quickly access all of the data of a sequence between the sub-data structure of a program outcome and the sub-data structure of a module outcome when querying for data for any of the sub-data structures in the sequence. In this way, upon receiving a request for data identifying an outcome of any sub-data structures of a sequence, the data processing system may quickly retrieve data from each sub-data structure of the sequence to provide data about the sequence (and any other sequences that include the sub-data structure) to the requesting computing device. Every outcome can be tagged to an activity from the first hierarchical data structure to illustrate what parts of a course or program achieve the desired outcomes of an accreditor or a particular institution.

The data processing system may link related sequences between the two hierarchical data structures together. The data processing system may link sequences together that correspond to the same program. For example, the data processing system may link a sequence for a program from the curriculum hierarchical data structure to a sequence of outcomes for the program from the outcome hierarchical data structure. To do so, the data processing system may link the terminal sub-data structure (e.g., an activity sub-data structure) of the sequence for the program from the curriculum hierarchical data structure to the terminal sub-data structure (e.g., a module outcome sub-data structure) of a sequence corresponding to outcomes for the program from the outcome hierarchical data structure. As described herein, the terminal sub-data structure in the outcome hierarchical data structure may be associated with an objective and may be an objective sub-data structure. The data processing system may do so by "tagging" the terminal sub-data structure of the sequence from the curriculum hierarchical data structure with an identifier of the terminal sub-data structure of the sequence from the outcome hierarchical data structure.

For example, to link the sequences from the two sub-data structures, at step 306, the data processing system (or an administrator) may identify the terminal sub-data structure of the curriculum sequence and determine which of the sub-data structures of the corresponding sequence in the outcome hierarchical data structure does not have any "children sub-data structures." For example, the data processing system may receive a request to link a sequence of sub-data structures for a program from the curriculum hierarchical data structure with a sequence of sub-data structures for outcomes of the program from the outcome hierarchical data structure. The request may include identifiers of different outcomes for the program. The data processing system may identify an outcome sub-data structure in the outcome hierarchical data structure that has a matching string to one of the identifications. The data processing system may extract the data from the identified sub-data structure. If the sub-data structure has an identifier for a child sub-data structure, at step 308, the data processing system may identify the child sub-data structure. The data processing system may identify the child sub-data structure based on the identifier for the child sub-data structure. The data processing system may iteratively repeat steps 306 and 308 until the data processing system identifies a sub-data structure that does not have a child sub-data structure.

Upon identifying an outcome sub-data structure without a child sub-data structure (e.g., a terminal sub-data structure), at step 310, the data processing system may link the terminal sub-data structure of the curriculum hierarchical data structure with the identified outcome sub-data structure without a child sub-data structure. To do so, in some implementations, the data processing system may insert (or tag) an identifier of the terminal outcome sub-data structure to the terminal sub-data structure of the curriculum hierarchical data structure. In doing so, the data processing system may add the identifier to a field of the terminal sub-data structure that is dedicated to storing identifiers of sub-data structures. In some implementations, instead of inserting the identifier into the sub-data structure of the curriculum hierarchical data structure, the data processing system may insert the identifier into another database with an identifier of the terminal sub-data structure of the curriculum hierarchical data structure, thus creating a pair of linked identifiers.

In some implementations, the data processing system may identify the terminal sub-data structure of the sequence of the outcome hierarchical data structure based on a user input. For example, a user viewing a visual representation of an activity sub-data structure in the curriculum hierarchical data structure may input an identifier of an outcome sub-data structure in the outcome hierarchical data structure to link the two sub-data structures together. The user may do so after determining the outcome sub-data structure is the last sub-data structure of a sequence in the outcome hierarchical data structure. Upon receiving the input, the data processing system may add the input identifier into the terminal sub-data structure of the curriculum hierarchical data structure. The data processing system may similarly link any number of sequences of sub-data structures between the curriculum hierarchical data structure and the outcome hierarchical data structure.

In some implementations, the sequences of the curriculum hierarchical data structure and/or outcome hierarchical data structure may have overlapping sub-data structures. This may be the case when one of the sub-data structures of the curriculum hierarchical data structure has more than one child and/or parent sub-data structure and there are therefore multiple paths through the respective sub-data structure from an initial sub-data structure to a terminal sub-data structure. For example, a course sub-data structure may be linked to a program sub-data structure and multiple module sub-data structures. The module sub-data structures may each be linked to different activity sub-data structures. In this example, there may be multiple sequences for the program sub-data structure through the course sub-data structure, through the different module sub-data structures, and/or through the activity sub-data structures. Advantageously, if the data processing system receives a request for data about the course, the data processing system may identify each sequence of sub-data structures that includes the course sub-data structures for the course and retrieve data from the sub-data structures in each sequence. The sequences of the outcome hierarchical data structure may similarly have multiple sequences that include common sub-data structures.

In some implementations, sequences in the curriculum hierarchical data structure may be linked to multiple sequences in the outcome hierarchical data structure. For example, an activity sub-data structure in the curriculum hierarchical data structure may be linked to multiple outcome sub-data structures in the outcome hierarchical data structure. This may be the case, for example, if completing an activity completes or is a part of completing multiple outcomes of the outcome hierarchical data structure. By linking individual sequences in the curriculum hierarchical data structure to multiple sequences in the outcome hierarchical data structure, the data processing system may be able to quickly retrieve relevant data from each hierarchical data structure in response to receiving a request that only identifies a single sub-data structure.

At step 312, the data processing system may receive a request for data from a sub-data structure. The data processing system may receive the request from a computing device over a network. The request may be, for example, a request for data about a program that has been established by a school and the outcomes that are involved in completing the program. The request may only include an identifier of the program. The data processing system may receive requests for any element of a program (e.g., the program itself, a course of the program, a module of the course, an activity of the module) or any outcomes that are involved in completing such elements.

In some implementations, at step 314, the data processing system may identify the hierarchical data structure to search for data that matches the request. The data processing system may do so by identifying whether the request is for data about an outcome or a request for data about an element of a program. The data processing system may do so, for example, by identifying characters in the request and determining if the characters include the string "objective" or "outcome" or if the characters include the string "program," "course," "module," or "activity." If the data processing system identifies either of the strings objective or outcome, the data processing system may identify the outcome hierarchical data structure. If the data processing system identifies any of the strings program, course, module, or activity, the data processing system may identify the curriculum hierarchical data structure. The data processing system may identify either hierarchical data structure based on any predefined string. In some implementations, the request may include an identifier of the hierarchical data structure itself. In this case, the data processing system may identify the hierarchical data structure based on the identifier. If the data processing system is not able to identify a hierarchical data structure based on the request, the data processing system may transmit an error message to the requesting computing device.

Upon identifying a hierarchical data structure based on a request, at step 316, the data processing system may determine if any sub-data structures in the hierarchical data structure include a string that matches an identifier included in the request. For example, the data processing system may identify the curriculum hierarchical data structure for the request based on the request including an identifier for the hierarchical data structure. The data processing system may identify a "CourseC" string in the request and search the curriculum hierarchical data structure for a sub-data structure that includes a matching CourseC string. If the data processing system is not able to identify any matching strings, at step 318, the data processing system may generate and transmit an error notification to the requesting client device indicating that no match could be found. Otherwise, the data processing system may identify the sub-data structure that includes a matching string.

After identifying the sub-data structure that includes the matching string, at step 320, the data processing system may identify the terminal sub-data structure of a sequence (e.g., a third sequence) that includes the identified sub-data structure. For example, after identifying the sub-data structure for which data is being requested, the data processing system may identify each sub-data structure that is in a sequence that includes the sub-data structure. The data processing system may identify the terminal sub-data structure of the sequence as the sequence that does not include an identifier of a child sub-data structure in the hierarchical data structure. The data processing system may identify terminal sub-data structures for each sequence that the sub-data structure is a part of.

At step 322, the data processing system may determine if the terminal sub-data structure of the sequence identified in step 320 is linked to a terminal sub-data structure in the other hierarchical data structure. The data processing system may do so by extracting the data in the terminal sub-data structure and determining if the extracted data includes an identifier of a terminal sub-data structure in the other hierarchical data structure or by searching an external database for a link between the terminal sub-data structure in the first sequence and a terminal sub-data structure in the other hierarchical data structure.

If the data processing system is able to identify a matching identifier with a terminal sub-data structure in the other hierarchical data structure, at step 324, the data processing system may identify each of the sequences (e.g., each fourth sequence) that the other terminal sub-data structure is a part of. The data processing system may retrieve data from the sequence including the sub-data structure with a string that matches the request and the sequences in the other hierarchical data structure that are linked to the sequence. If the data processing system is not able to identify a matching identifier, at step 326, the data processing system may identify the sub-data structures in the sequences of the hierarchical data structure that include the sub-data structure without identifying any sub-data structures in the other hierarchical data structure. At step 328, the data processing system may retrieve data from the sub-data structures that are in sequences that include the sub-data structure or that are otherwise linked to such sequences.

Figure 4:
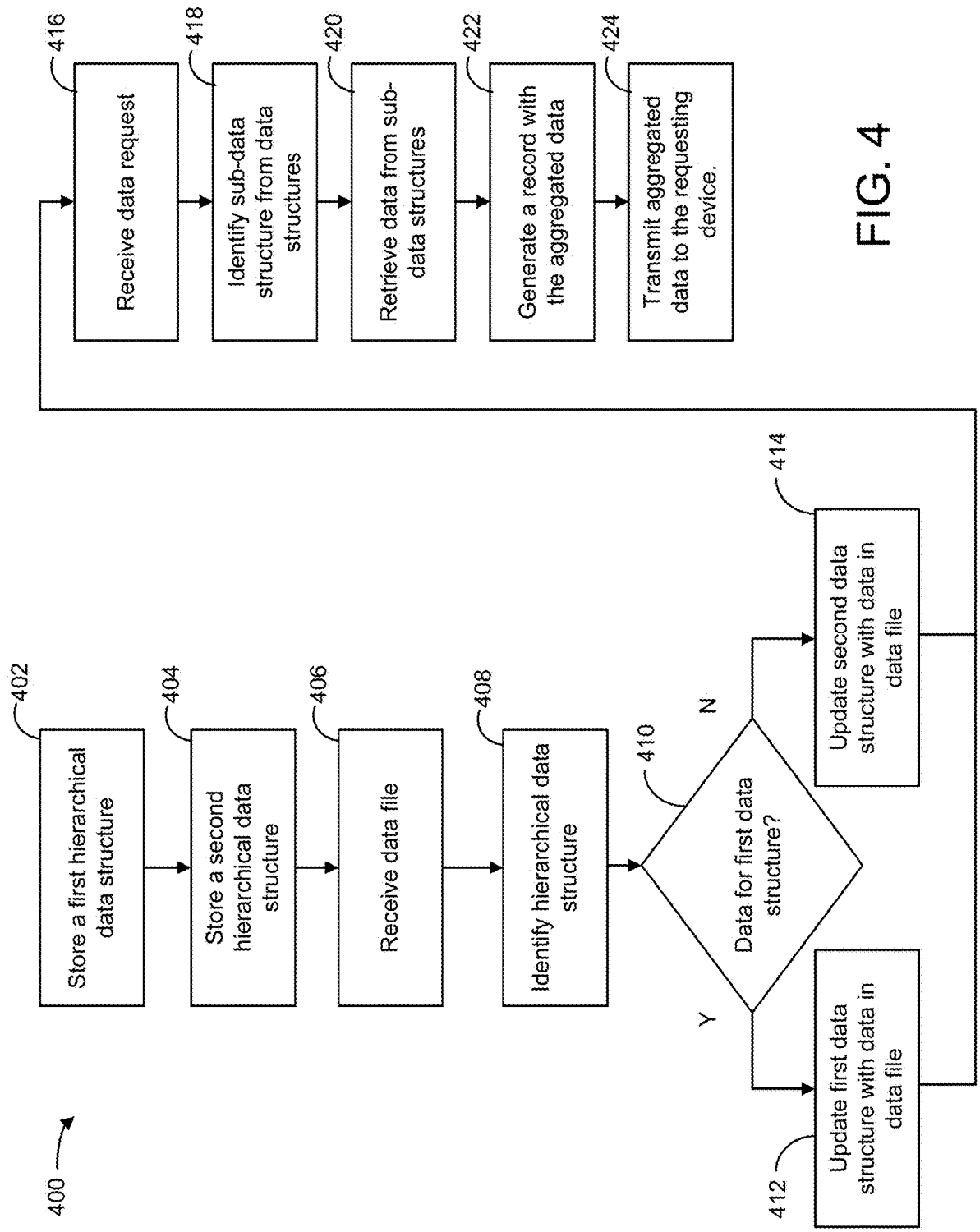
FIG. 4 is a flow chart of another implementation of a method for implementing a multi-hierarchy physical storage architecture, according to some implementations.

FIG. 4 is a flow chart of another implementation of a method 400 for implementing a multi-hierarchy physical storage architecture, according to some implementations. Method 400 may be performed by a data processing system (e.g., curriculum data storage device 202, shown and described with reference to FIG. 2). Performance of method 400 may enable the data processing system to store and update curriculum data for different organizations and programs in a manner that enables efficient use of memory and quick data retrieval, thus allowing the data processing system to operate faster and store data for other applications. Method 400 may include any number of steps and the steps may be performed in any order.

At step 402, the data processing system may store a first hierarchical data structure. The first hierarchical data structure may be a program hierarchical data structure that stores data about different elements of programs. At step 404, the data processing system may store a second hierarchical data structure. The second hierarchical data structure may be an outcome hierarchical data structure that stores outcomes for different programs. The data processing system may perform steps 402 and 404 similar to how the data processing system performs steps 302 and 304, as described with reference to FIG. 3.

At step 406, the data processing system may receive a data file. The data processing system may receive the data file from a computing device communicating with the data processing system over a network. In some implementations, the data processing system may receive the data file after a user accessing the computing device provides an input identifying a type (e.g., program or outcome) of the data file. For instance, the data processing system may provide a hosted application to the computing device that includes a data import option at a user interface. A user accessing the computing device may select the data import option, select a type of file being uploaded, and upload the data file to the data processing system through the user interface.

The data file may include different types of data depending on its data type. For example, if the data file includes data for a program, the data file may include data for an institution that created or is otherwise associated with the program, a program name, a course number, a course name, a module name, an activity name, an activity type, Blooms Taxonomy, and/or a time on task estimate. If the data file includes data for an outcome, the data file may include data for a mapping type, a mapping alias, a program learning outcome, a course learning outcome, and/or a module learning outcome. The different types of data files may include any type of data.

Upon receiving the data file, at step 408, the data processing system may identify a hierarchical data structure. The data processing system may identify a curriculum hierarchical data structure or an outcome hierarchical data structure based on the type of data file that was input by the user. For example, if the user selected a program type at the user interface, the data processing system may identify the curriculum hierarchical data structure. If the user selected an outcome type at the user interface, the data processing system may identify the outcome hierarchical data structure. Such identification may enable the data processing system to store the data in sub-data structures of the correct hierarchical data structures to facilitate the data storage and retrieval improvements described herein.

At step 410, the data processing system may determine if the data is for the curriculum hierarchical data structure or the outcome hierarchical data structure. The data processing system may do so as described in step 408, in which case steps 408 and 410 may be combined or be the same step.

If the data processing system determines the data is for the curriculum hierarchical data structure, at step 412, the data processing system may update the curriculum hierarchical data structure with the data in the file. The data processing system may update the curriculum hierarchical data structure by either adding data to existing sub-data structures or by generating new sub-data structures in the curriculum hierarchical data structure. For example, upon receiving an uploaded data file and identifying the curriculum hierarchical data structure, the data processing system may search the curriculum hierarchical data structure for sub-data structures that store data for the same program elements that are included in the data file. If the data processing system identifies any sub-data structures that match strings in the data file, the data processing system may extract data from the data file and insert the data in the matching sub-data structures. However, if the data processing system is not able to identify any matching sub-data structures for an element in the data file, the data processing system may instead generate a new sub-data structure for the element and link the new sub-data structure to the other existing or newly generated sub-data structures in the curriculum hierarchical data structure based on the links (e.g., stored relationships, such as being a part of the same row) in the data file. If the data processing system determines the data is for the outcome hierarchical data structure, at step 414, the data processing system may add data to the outcome hierarchical data structure (e.g., add data to existing sub-data structures or generate new sub-data structures) similar to how the data processing system adds data to the curriculum hierarchical data structure as described with respect to step 412.

At step 416, the data processing system may receive a data request. The data processing system may receive the data request from a computing device over a network. The data request may be a request for information about a particular element of a program or a particular outcome and include an identifier of the element or outcome. In some implementations, the request may also include a type of data being requested, such as an estimated time it will take to complete the element, a list of items that need to be completed to complete the outcome or element, the program with which the element is associated, an estimate of the total time it will take to complete an element of a child sub-data structure, a percentage of time spent on a child element in comparison to a parent element, a count of elements with which a child sub-data structure is linked, etc.

At step 418, the data processing system may identify the sub-data structure that corresponds to the program element or outcome identified in the request. The data processing system may identify the sub-data structure by identifying the string of the program element or outcome identifier in the request and comparing the string to the respective hierarchical data structure (e.g., if the request is for a program element, the data processing system may compare the string to the curriculum hierarchical data structure, and if the request is for an outcome, the data processing system may compare the string to the outcome hierarchical data structure). The data processing system may identify the sub-data structure that includes a string that matches the identifier.

In some implementations, the data processing system may additionally identify the sub-data structures with which the identified sub-data structure is in a sequence. For example, if the request includes an identifier of a course and the sub-data structure for the course is a part of multiple sequences within the curriculum hierarchical data structure, the data processing system may identify each of the sub-data structures in the different sequences.

In some implementations, the data processing system may further identify sequences of sub-data structures in the other hierarchical data structure with which the sub-data structure is linked. For example, the data processing system may identify the terminal sub-data structures of the sequences that include the sub-data structure identified based on the request from the curriculum hierarchical data structure. The data processing system may then identify any links between the terminal sub-data structures from the curriculum hierarchical data structure and terminal sub-data structures in the outcome hierarchical data structure. The data processing system may identify the sequences of sub-data structures that include the terminal sub-data structures from each hierarchical data structure and identify the sub-data structures in the sequences.

At step 420, the data processing system may retrieve data from the identified sequences of sub-data structures. The data processing system may retrieve data based on the request. For example, if the request is for a time on task estimate of a course, the data processing system may retrieve activity time on task estimate data from each activity that is linked (either directly or indirectly through a module) to the course. If the request is to determine a percentage of time an activity takes to complete compared to other activities that are linked to the same module, the data processing system may retrieve the activity time on task of each activity that is linked to the module and calculate a percentage time on task for the requested activity. If the request is for a list of elements and outcomes that are all associated with the same program, the data processing system may retrieve the strings identifying the names of each element and outcome from the sub-data structures in the sequences that are associated with the program (e.g., the program sub-data structure is a part of the sequence in the curriculum hierarchical data structure or the program sub-data structure is linked to a sequence of sub-data structures in the outcome hierarchical data structure). The data processing system may retrieve any subset of data from such sub-data structures depending on the request.

At step 422, the data processing system may generate a record (e.g., a file, document, table, listing, message, notification, etc.) with the retrieved data. The data processing system may generate the record by aggregating the requested data into a particular format. The particular format may depend on the type of data that was requested. For example, if the request was for a list of sub-data structures, the data processing system may generate a list from the retrieved data. If the request was for a comparison of data between different elements, the data processing system may aggregate the data (e.g., a time on task estimate for two different modules) and generate a graph or table that illustrates the comparison. The data processing system may generate a record in response to any type of request for data. At step 424, the data processing system may transmit the record to the requesting computing device over the network. In some implementations, in cases in which the data processing system manipulates the data (e.g., creates a comparison graph or aggregates the data), the data processing system may transmit the manipulated data with the raw data itself to provide an overview and context for the data.

In some implementations, the data processing system may store aggregated data from child sub-data structures in the parent sub-data structures of the children. For example, the data processing system may receive a request that includes an identifier of a course sub-data structure. The request may be for a total estimated time to complete the respective course of the course sub-data structure. Upon receiving the request, the data processing system may identify the module sub-data structures that are linked to the course sub-data structure and the activity sub-data structures that are linked to the respective module sub-data structures. The data processing system may aggregate the activity time on task estimates of the activity sub-data structures linked to each module sub-data structure to obtain a module time on task estimate for the respective module. The data processing system may then aggregate the module time on task estimates to obtain a course time on task estimate for the course. The data processing system may store the time on task estimates for the course and the different modules in their respective sub-data structures such that the data processing system may quickly retrieve the time on task estimate data upon receiving a request for the data.

In some implementations, the data processing system may update the data stored in the sub-data structures in real-time as the data processing system receives new data and updates existing sub-data structures or generates new sub-data structures. For example, the data processing system may generate a new activity sub-data structure upon receiving a data file from a computing device. The activity sub-data structure may include an activity time on task estimate and may be linked to one or more different module sub-data structures. Upon generating the activity sub-data structure, the data processing system may identify the activity time on task estimate of the activity sub-data structure and the module sub-data structures that are linked to the activity sub-data structure. The data processing system may extract the module time on task estimates from the identified module sub-data structures, aggregate the new activity time on task estimate with the module time on task estimates, and store the updated module time on task estimates in the module sub-data structures. The data processing system may similarly update the course sub-data structures that are linked to the updated module sub-data structures. Thus, the data processing system may maintain an accurate real-time view of the curriculum hierarchical data structure for accurate and quick data retrieval.

In some implementations, the data processing system may store time on task estimates for the different outcomes that are stored in the outcome hierarchical data structure. For example, the data processing system may identify the activity sub-data structures that are linked (e.g., directly linked or linked through other outcome sub-data structures) to different outcome sub-data structures in the outcome hierarchical data structure. The data processing system may aggregate the activity time on task estimates in the activity sub-data structures that are linked to different module outcome sub-data structures to obtain module outcome time on task estimates for each module outcome sub-data structure. The data processing system may then aggregate the module outcome time on task estimates from module outcome sub-data structures that are linked to individual course sub-data structures to obtain course outcome time on task estimates for each course outcome sub-data structure. The data processing system may then aggregate the course outcome time on task estimates from course outcome sub-data structures that are linked to program sub-data structures to obtain program outcome time on task estimates. The data processing system may store the time on task estimates for each outcome sub-data structure and update the time on task estimates and data and/or sub-data structures are added or removed from the hierarchical data structures.

In some implementations, sub-data structures from one hierarchical data structure may store identifiers of sub-data structures that they are linked to sub-data structures in the other hierarchical data structure. For example, a course sub-data structure may be linked to one or more sequences of sub-data structures in the outcome hierarchical data structure. The data processing system may receive a request identifying the course of the course sub-data structure. The request may be for the outcomes that are required to be completed to complete the course. The data processing system may identify the outcome data structures in the outcome hierarchical data structure that are linked to the course sub-data structure, extract a string identifying the outcome sub-data structure, and store the identifier in the course sub-data structure. The data processing system may update the list of outcomes in the course sub-data structure as outcome sub-data structures are added to the outcome hierarchical data structure and linked to the course sub-data structure. Thus, if the data processing system ever receives a request for the outcomes that are required to complete the course of the course sub-data structure, the data processing system may retrieve the data from the course sub-data structure instead of querying an entire database for entries that match a search string.

In some implementations, the sub-data structures in the outcome hierarchical data structure may store outcome set identifiers indicating whether the outcomes can be linked to activity sub-data structures and/or other outcome sub-data structures. In doing so, the data processing system may store local outcome set identifiers in the outcome sub-data structures that indicate the outcome sub-data structures may only be shared by users that are employed or individually associated with the partner or organization that uploaded data for the outcome. The data processing system may also store global outcome set identifiers in the outcome sub-data structures that indicate data from the outcome sub-data structures may be shared with any user account that has read and/or write access to the data processing system. Such identifiers may be set in the outcome sub-data structures based on a user input. For example, the data processing system may storing a local outcome set identifier in a program outcome sub-data structure. The data processing system may receive, from a user account being accessed by a client device, a request to view data from the program outcome sub-data structure. The data processing system may determine the user account has permission to view the second initial sub-data structure based on the local outcome set identifier. The data processing system may do so based on settings of the user account indicating the user account that indicate the user account is associated with the partner or organization that created the program outcome sub-data structure. Responsive to the determination, the data processing system may provision data from the program outcome sub-data structure to the user account.

FIGS. 5A-5D are illustrations of a user interface for uploading and viewing data for a program or outcome, according to some implementations. As illustrated, FIG. 5A includes a user interface 500 that a data processing system (e.g., curriculum data storage device) may provide to a user at a computing device (e.g., computing device 206) to give the user the ability to export or import data. As illustrated, user interface 500 may include data import and export options 502 that a user may select to either upload data to the data processing system for storage or request data from the data processing system.

Figure 5A:
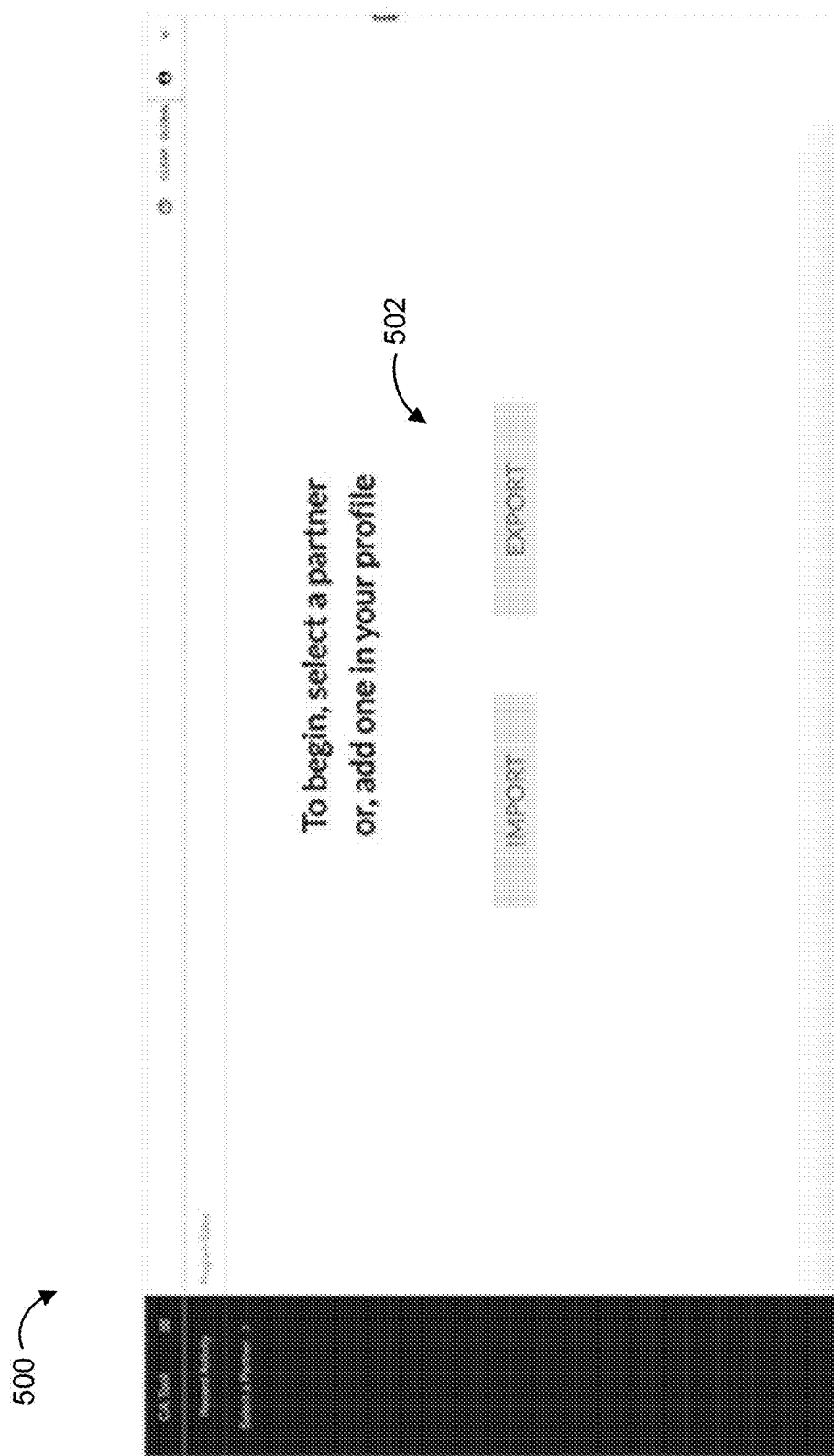
FIGS. 5A-5D are illustrations of a user interface for uploading, viewing, and editing data for a program or outcome, according to some implementations.
Figure 5B:
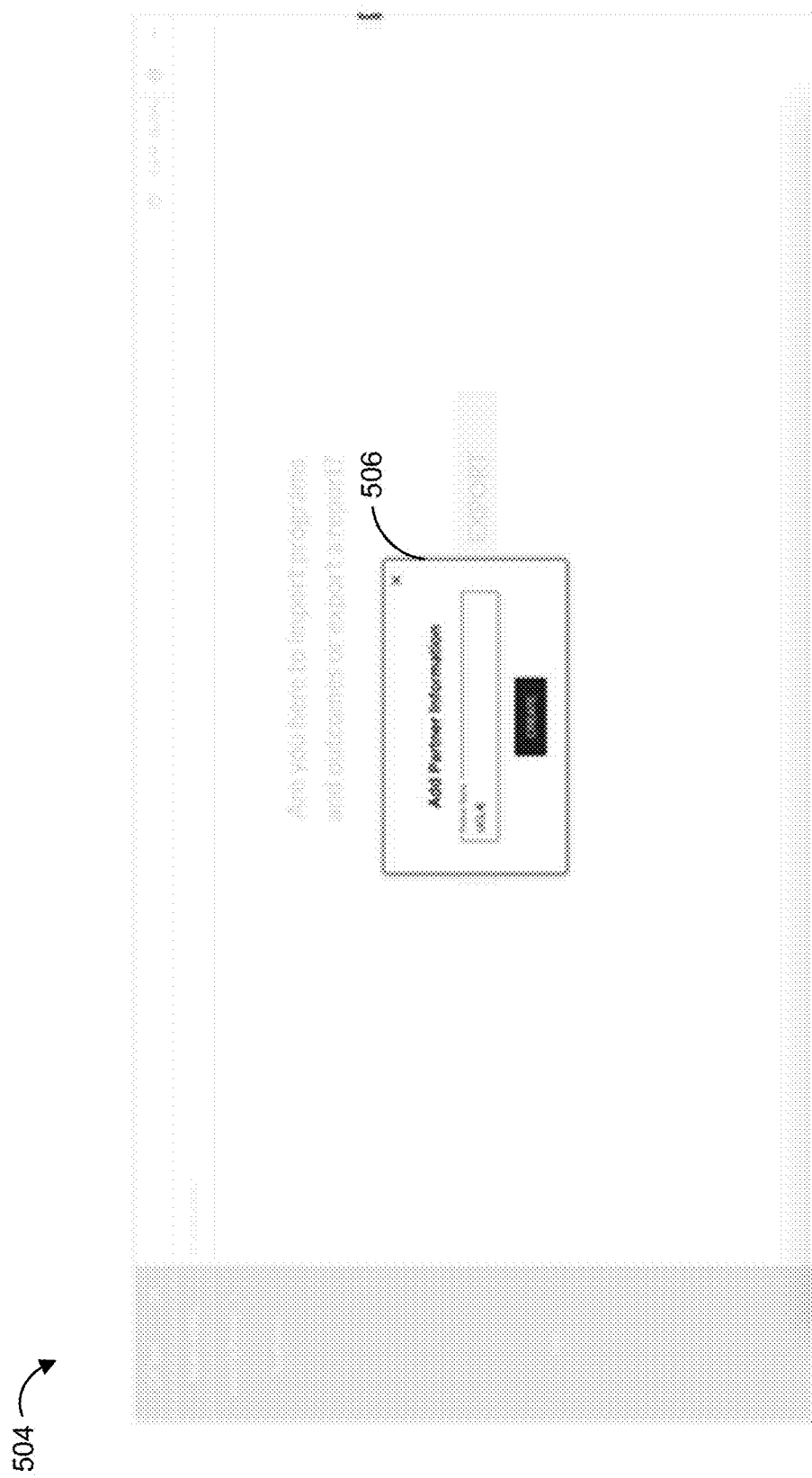

Upon selection, the import option at user interface 500, the data processing system may provide user interface 504 to the computing device, as shown in FIG. 5B. User interface 504 may include a partner input pop-up 506 that includes a form in which the user may input the partner (e.g., business or organization) for which the data is being imported. For example, if the user is importing data for a new program for an accreditation agency, the user may input the name of the accreditation agency in partner input pop-up 506.

Figure 5C:
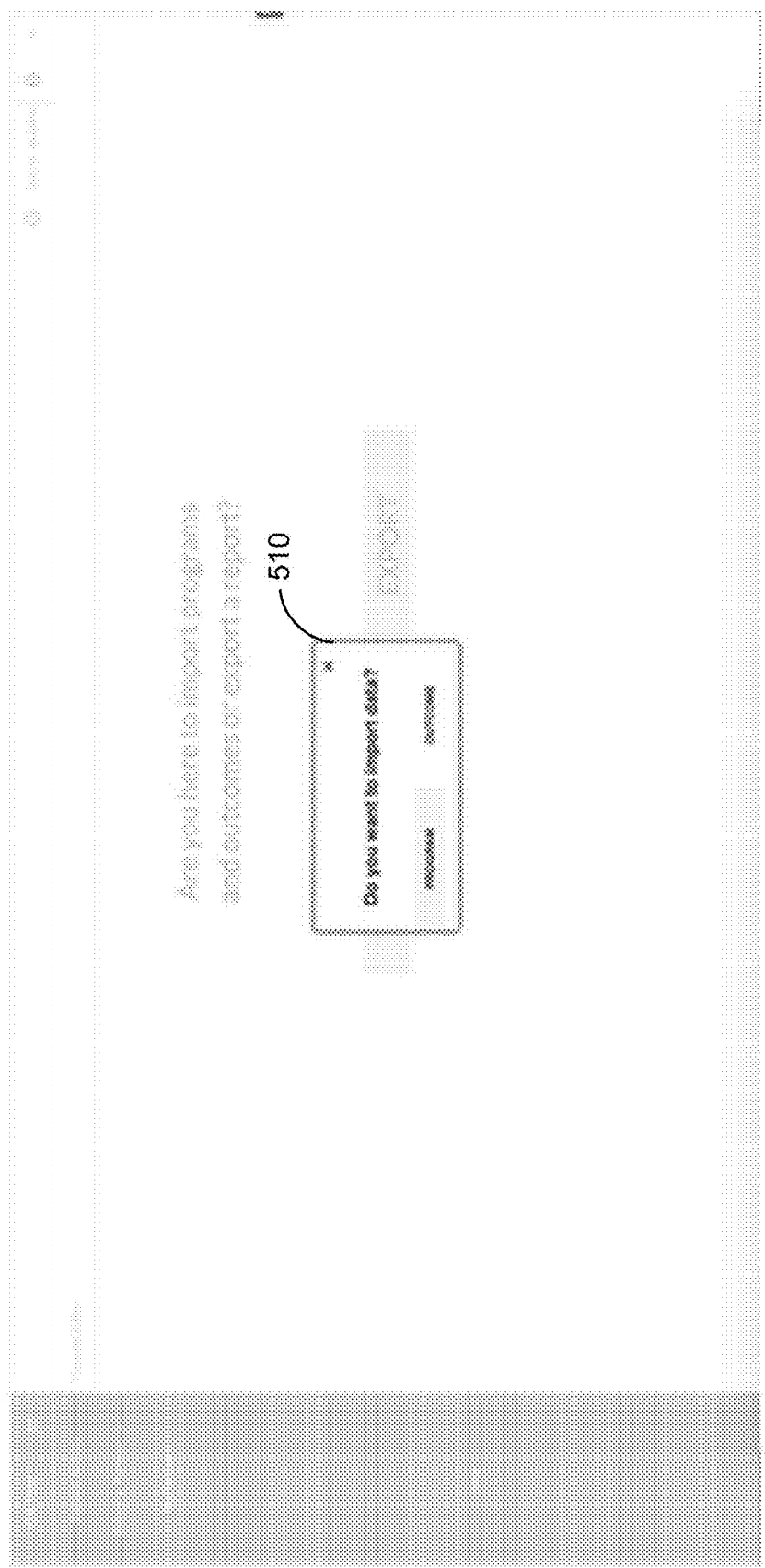

Upon selection of a create option in partner input pop-up 506, the data processing system may provide user interface 508, as shown in FIG. 5C. User interface 508 may include a data file type pop-up 510 that includes options indicating the type of data that the user is uploading to the data processing system. As illustrated, data file type pop-up 510 may include a program option and an outcome (e.g., objective) option. As described herein each option may correspond to a different hierarchical data structure that the data processing system stores in memory. The user may select the option in the data file type pop-up 510 that corresponds to the type of data the user is uploading to upload the data file to the data processing system.

Figure 5D:
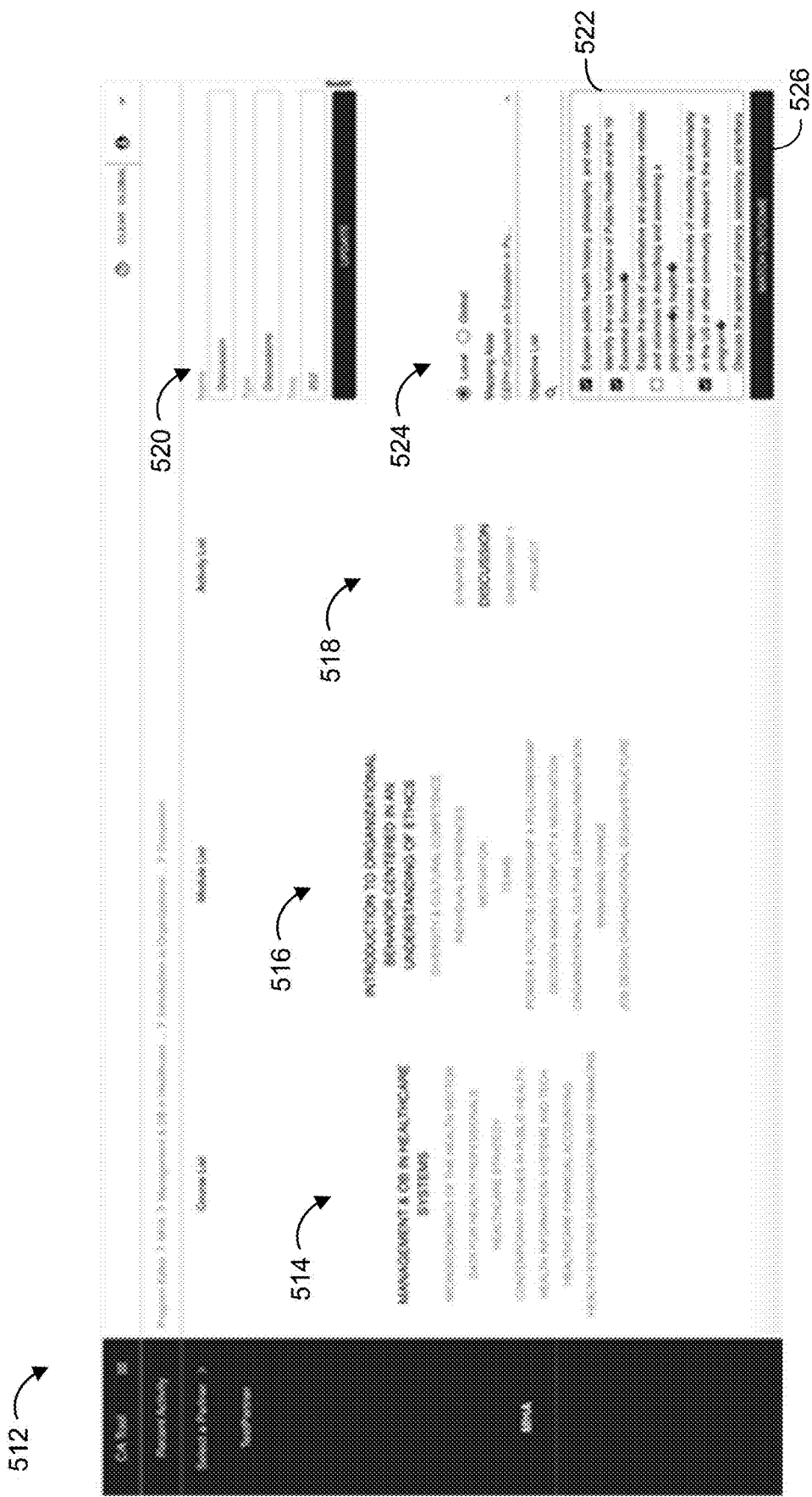

FIG. 5D includes a user interface 512 that the data processing system may provide to the user at the computing device to give the user the ability to view information about a particular program. As illustrated, user interface 512 may include a course list 514, a module list 516, and an activity list 518. Course list 514 may include a list of courses that are required to be completed to complete a program. A user may select a course of course list 514 to cause module list 516 to appear. Module list 516 may include a list of modules that are required to be completed to complete the selected course. The user may select a module from module list 516 to view activity list 518. Activity list 518 may include a list of activities that are required to be completed to complete the selected module. A user viewing user interface 512 may select the different courses, modules, and/or activities on lists 514-518 to view the different paths or sequences of courses that are required to complete the program.

User interface 512 may also include activity information 520. Activity information may include a name, type, and estimated completion time for the currently selected activity of activity list 518. A user viewing user interface 512 may edit activity information 520 via user interface 512. Upon receiving any edits at user interface 512, the data processing system may identify the sub-data structure for the activity being edited and update the information in the sub-data structure.

User interface 512 may also include an outcomes list 522. Outcomes list 522 may include a list of outcomes that are stored in an outcome hierarchical data structure. A user may view outcomes list 522 upon selecting one of permissions radio buttons 524 to view either a local set of outcomes that are only available to users of the same partner as the user (e.g., the company that employs the user) or the global set of outcomes that are available to all users (and may, in some implementations, include the local set of outcomes as well). The user viewing user interface 512 may select selectable boxes next to the outcomes to which the boxes correspond to identify outcomes to match or link to a currently selected activity of activity list 518. The user may then select a match outcome button 526 to link the selected outcomes with the activity in the underlying hierarchical data structures as described herein.

Figure 6:
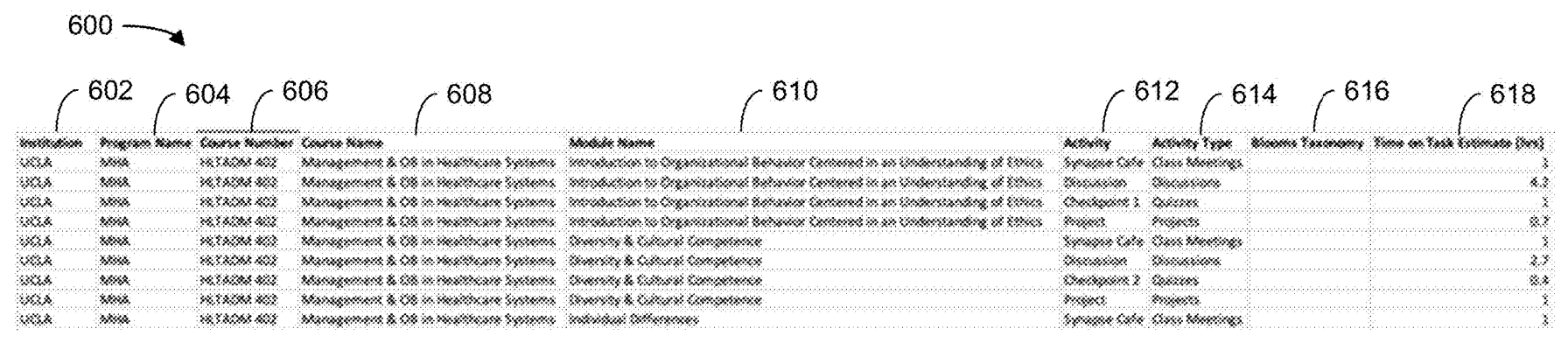

FIG. 6 is an example file 600 for uploading data to a curriculum hierarchical data structure, according to some implementations. As illustrated, file 600 may include columns 602-618 that each includes a different subset of data that can be uploaded to the curriculum hierarchical data structure. Column 602 may include data identifying an institution or partner for which the data is being uploaded. Column 604 may include data identifying a program name. Column 606 may include data identifying a course number. Column 608 may include data identifying a course name. Column 610 may include data identifying a module name. Column 612 may include data identifying an activity name.

Column 614 may include data identifying an activity type. Column 616 may include data identifying a Blooms Taxonomy Level. Column 618 may include data identifying a time on task estimate for the corresponding activity. A user may upload file 600 to a data processing system (e.g., curriculum data storage device 202) and the data processing system may update the data in the curriculum hierarchical data structure with the data in file 600. For example, the data processing system may generate activity sub-data structures for any new activities that are identified in file 600 and link the activity sub-data structures to the corresponding modules that are identified in column 610. The data processing system may include the activity name, activity type, Blooms Taxonomy Level, and time on task estimate for each activity in the generated activity sub-data structures. If a sub-data structure already exists for one of the activities in the curriculum hierarchical data structure, the data processing system may update the existing sub-data structure with data from the file (e.g., replace or add the activity type, Blooms Taxonomy Level, and/or time on task estimate in the same row as the activity identifier to the activity sub-data structure). In some cases, if a sub-data structure does not exist for a course or a module, the data processing system may similarly generate a sub-data structure for the respective course or module and link the generated sub-data structure to the other sub-data structures of the same row in file 600.

Figure 7:
FIG. 7 is an example file for uploading data to an outcome hierarchical data structure, according to some implementations.

FIG. 7 is an example file 700 for uploading data to an outcome hierarchical data structure, according to some implementations. As illustrated, file 700 may include columns 702-710 that each includes a different subset of data that can be uploaded to the outcome hierarchical data structure. Column 702 may include data identifying a mapping type (e.g., a purpose of the outcome). Column 704 may include data identifying a mapping alias. Column 706 may include data identifying a program outcome. Column 708 may include data identifying a course outcome. Column 710 may include data identifying a module outcome. A user may upload file 700 to a data processing system (e.g., curriculum data storage device 202) and the data processing system may update the data in the outcome hierarchical data structure with the data from file 700. For example, the data processing system may generate module outcome sub-data structures for any new module outcomes that are identified in file 700 and link the module outcome sub-data structures to the course outcome sub-data structures of the corresponding course outcome that are identified in column 710. The data processing system may include the description or title of the module outcome in the generated module outcome sub-data structures. In some cases, if a sub-data structure does not exist for a course outcome or a program outcome, the data processing system may similarly generate a sub-data structure for the respective course outcome or program outcome and link the generated sub-data structure to the other sub-data structures of the same row in file 700.

Figure 8:
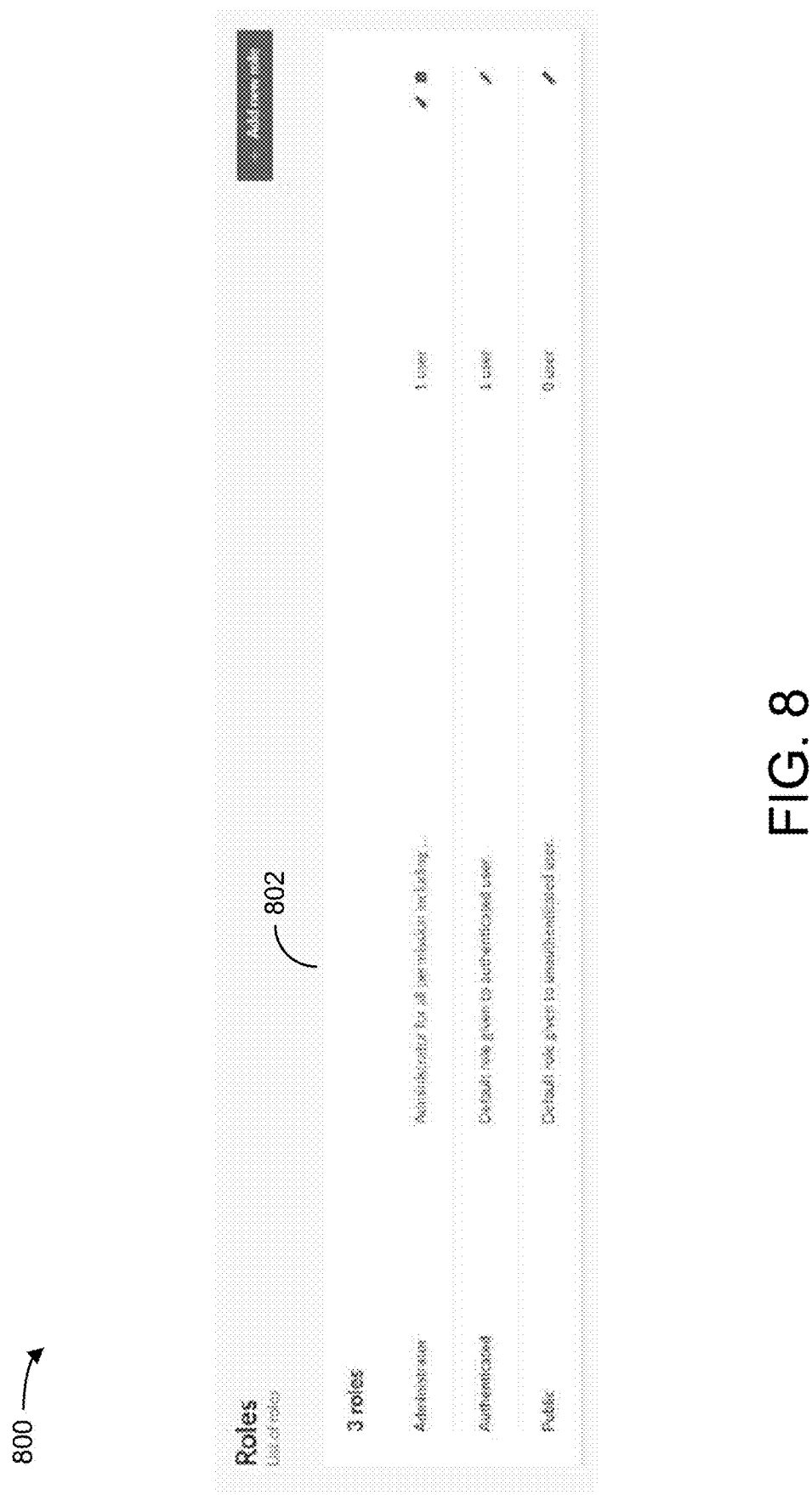
FIG. 8 is an example user interface showing the different roles of the systems and methods described herein, according to some implementations.

FIG. 8 is an example user interface 800 showing the different roles of the systems and methods described herein, according to some implementations. A data processing system (e.g., curriculum data storage device 202) may provide user interface 800 to a user. User interface 800 may include a list of roles 802. List of roles 802 may include an administrator role, an authenticated role, and/or a public role. The public role may only have login permission and read access to the data stored by the data processing system. The authenticated role may have all permissions to get, update, and delete data from a curriculum hierarchical data structure and an outcome hierarchical data structure as stored by the data processing system. An authenticated role may have all of the permissions of the administrator role and have the ability to upload global outcome sets (which can be stored in the outcome hierarchical data structure) that may be available for all users to use.

In one aspect, the present disclosure is directed to a method for data storage and retrieval from a computer memory. The method may include storing, by a computing device, a first hierarchical data structure comprising a first sequence of sub-data structures, the first sequence of sub-data structures comprising a first initial sub-data structure, a first intermediate sub-data structure, and a first terminal sub-data structure, the first initial sub-data structure comprising a first intermediate identifier of the first intermediate sub-data structure, the first intermediate sub-data structure comprising a first terminal identifier of the first terminal sub-data structure and a first initial identifier of the first initial sub-data structure, and the first terminal sub-data structure comprising a second intermediate identifier of the first intermediate sub-data structure; storing, by the computing device, a second hierarchical data structure comprising a second sequence of sub-data structures, the second sequence of sub-data structures comprising a second initial sub-data structure, a second intermediate sub-data structure, and a second terminal sub-data structure, the second initial sub-data structure comprising a first intermediate identifier of the second intermediate sub-data structure, the second intermediate sub-data structure comprising a first terminal identifier of the second terminal sub-data structure and a first initial identifier of the second initial sub-data structure, and the second terminal sub-data structure comprising a second intermediate identifier of the second intermediate sub-data structure; and linking, by the computing device, the first sequence of sub-data structures with the second sequence of sub-data structures.

In some implementations, linking the first sequence of sub-data structures with the second sequence of sub-data structures comprises inserting, by the computing device, a second terminal identifier of the second terminal sub-data structure into the first terminal sub-data structure. In some implementations, the method may further include receiving, by the computing device, a request comprising an identification of the second terminal sub-data structure; and retrieving, by the computing device, data from each sub-data structure in the first sequence of sub-data structures and in the second sequence of sub-data structures based on the second terminal identifier of the second terminal sub-data structure in the first terminal sub-data structure. In some implementations, retrieving the data from each sub-data structure in the first sequence of sub-data structures and in the second sequence of sub-data structures comprises identifying, by the computing device, the first terminal sub-data structure in response to the request based on the first terminal sub-data structure comprising the second terminal identifier of the second terminal sub-data structure; and responsive to identifying the first terminal sub-data structure, identifying, by the computing device, the first intermediate sub-data structure based on the second intermediate identifier of the first intermediate sub-data structure in the first terminal sub-data structure.

In some implementations, retrieving the data from each sub-data structure in the first sequence of sub-data structures and in the second sequence of sub-data structures further comprises identifying, by the computing device, the second terminal sub-data structure based on the second terminal identifier of the second terminal sub-data structure in the first terminal sub-data structure; and responsive to identifying the second terminal sub-data structure, identifying, by the computing device, the second intermediary sub-data structure based on the second intermediate identifier of the second intermediate sub-data structure in the second terminal sub-data structure. In some implementations, the method further includes storing, by the computing device, data within each of the sub-data structures in the first sequence of sub-data structures and in the second sequence of sub-data structures.

In some implementations, the method further includes storing, by the computing device, a third sequence of sub-data structures in the first hierarchical data structure and a fourth sequence of sub-data structures in the second hierarchical data structure; responsive to a sub-data structure of the fourth sequence of sub-data structures not including an identifier for any child sub-data structure, linking, by the computing device, a third terminal sub-data structure of the third sequence of sub-data structures to the sub-data structure of the fourth sequence of sub-data structures by inserting an identifier for the sub-data structure of the fourth sequence into the third terminal sub-data structure. In some implementations, the method further includes storing, by the computing device, a third sequence of sub-data structures in the first hierarchical data structure, the third sequence of sub-data structures comprising the first initial sub-data structure, the first intermediate sub-data structure, and a third terminal sub-data structure, the first intermediate sub-data structure further comprising a first terminal identifier of the third terminal sub-data structure; storing, by the computing device, a fourth sequence of sub-data structures in the second hierarchical data structure, the fourth sequence of sub-data structures comprising a third initial sub-data structure, a third intermediate sub-data structure, and a fourth terminal sub-data structure, the third intermediate sub-data structure further comprising a fourth terminal identifier of the fourth terminal sub-data structure; and linking, by the computing device, the third sequence of sub-data structures and the fourth sequence of sub-data structures.

In some implementations, the method further includes receiving, by the computing device, a request comprising an identifier of the first initial sub-data structure; retrieving, by the computing device, data from each sub-data structure in the first sequence of sub-data structures and in the second sequence of sub-data structures based on the identifier of the first initial sub-data structure and the second terminal identifier of the second terminal sub-data structure in the first terminal sub-data structure; and storing, by the computing device, the retrieved data from the second sequence of sub-data structures to corresponding sub-data structures of the first sequence of sub-data structures. In some implementations, the first initial sub-data structure comprises course data about a course, the first intermediate sub-data structure comprises module data about a module for the course, and the first terminal sub-data structure comprises activity data about an activity for the module, the activity data comprising an activity time on task estimate, the module data comprising a module time on task estimate comprising an aggregate of activity time on task estimates of a plurality of terminal sub-data structures linked to the first intermediate sub-data structure, and the course data about the course comprising a course time on task estimate comprising an aggregate of module time on task estimates of a plurality of intermediate sub-data structures linked to the first initial sub-data structure.

The method of claim 10, wherein the second initial sub-data structure comprises program outcome data for a program, the second intermediate sub-data structure comprises course outcome data for the course, and the second terminal sub-data structure comprises module outcome data for the module, the module outcome data comprising an aggregation of activity time on task estimates of a second plurality of terminal sub-data structures in the first hierarchical data structure linked to the second terminal sub-data structure, the course outcome data comprising an aggregate of module outcome time on task estimates of a second plurality of terminal sub-data structures of the second hierarchical data structure linked to the second intermediate sub-data structure, and the program outcome data comprising an aggregate of course time on task estimates of a second plurality of intermediate sub-data structures of the second hierarchical data structure linked to the second initial sub-data structure. In some implementations, the method further includes adding, by the computing device, a third terminal sub-data structure to the first hierarchical data structure, the third terminal sub-data structure comprising a second activity time on task estimate and a third intermediate identifier for the first intermediate sub-data structure in the first hierarchical data structure; responsive to the third terminal sub-data structure having the third intermediate identifier for the first intermediate sub-data structure, adding, by the computing device, the second activity time on task estimate to the module time on task estimate of the first intermediate sub-data structure; and responsive to the addition of the second activity time on task estimate to the module time on task estimate and the first intermediate sub-data structure comprising a first initial identifier of the first initial sub-data structure, adding, by the computing device, the second activity time on task estimate to the course time on task estimate.

In some implementations, the method further includes receiving, by the computing device, a data file comprising a plurality of columns, the plurality of columns comprising a module name column, an activity name column, and a time on task estimate column; determining, by the computing device, there are not any terminal sub-data structures that match the activity name; and generating, by the computing device, a third terminal sub-data structure comprising a third intermediate sub-data structure identifier for the first intermediate sub-data structure, the third intermediate sub-data structure identifier included in the third terminal sub-data structure responsive to the first intermediate sub-data structure comprising a string that matches the module name in the data file. In some implementations, the method further storing, by the computing device, a local outcome set identifier in the second initial sub-data structure of the second hierarchical data structure; receiving, by the computing device from a user account being accessed by a client device, a request to view data from the second initial sub-data structure; determining, by the computing device, the user account has permission to view the second initial sub-data structure based on the local outcome set identifier; and provisioning, by the computing device, the data from the second initial sub-data structure to the user account responsive to the determination that the user account has permission to view the second hierarchical data structure.

In another aspect, the present disclosure is directed to a system for data storage and retrieval from a computer memory. The system may include a computing device comprising a processor and a memory. The processor may be configured to execute instructions stored in the memory to store a first hierarchical data structure comprising a first sequence of sub-data structures, the first sequence of sub-data structures comprising a first initial sub-data structure, a first intermediate sub-data structure, and a first terminal sub-data structure, the first initial sub-data structure comprising a first intermediate identifier of the first intermediate sub-data structure, the first intermediate sub-data structure comprising a first terminal identifier of the first terminal sub-data structure and a first initial identifier of the first initial sub-data structure, and the first terminal sub-data structure comprising a second intermediate identifier of the first intermediate sub-data structure; store a second hierarchical data structure comprising a second sequence of sub-data structures, the second sequence of sub-data structures comprising a second initial sub-data structure, a second intermediate sub-data structure, and a second terminal sub-data structure, the second initial sub-data structure comprising a first intermediate identifier of the second intermediate sub-data structure, the second intermediate sub-data structure comprising a first terminal identifier of the second terminal sub-data structure and a first initial identifier of the second initial sub-data structure, and the second terminal sub-data structure comprising a second intermediate identifier of the second intermediate sub-data structure; and link the first sequence of sub-data structures with the second sequence of sub-data structures.

In some implementations, the processor is configured to link the first sequence of sub-data structures with the second sequence of sub-data structures comprises inserting a second terminal identifier of the second terminal sub-data structure into the first terminal sub-data structure. In some implementations, the processor is further configured to receive a request comprising an identification of the second terminal sub-data structure; and retrieve data from each sub-data structure in the first sequence of sub-data structures and in the second sequence of sub-data structures based on the second terminal identifier of the second terminal sub-data structure in the first terminal sub-data structure.

In some implementations, the processor is configured to retrieve the data from each sub-data structure in the first sequence of sub-data structures and in the second sequence of sub-data structures by identifying the first terminal sub-data structure in response to the request based on the first terminal sub-data structure comprising the second terminal identifier of the second terminal sub-data structure; and responsive to identifying the first terminal sub-data structure, identifying the first intermediate sub-data structure based on the second intermediate identifier of the first intermediate sub-data structure in the first terminal sub-data structure. In some implementations, the processor is further configured to retrieve the data from each sub-data structure in the first sequence of sub-data structures and in the second sequence of sub-data structures by identifying the second terminal sub-data structure based on the second terminal identifier of the second terminal sub-data structure in the first terminal sub-data structure; and responsive to identifying the second terminal sub-data structure, identifying the second intermediary sub-data structure based on the second intermediate identifier of the second intermediate sub-data structure in the second terminal sub-data structure.

In yet another aspect, the present disclosure is directed to a non-transitory computer-readable medium storing instructions that cause one or more processors executing the instructions to store a first hierarchical data structure comprising a first sequence of sub-data structures, the first sequence of sub-data structures comprising a first initial sub-data structure, a first intermediate sub-data structure, and a first terminal sub-data structure, the first initial sub-data structure comprising a first intermediate identifier of the first intermediate sub-data structure, the first intermediate sub-data structure comprising a first terminal identifier of the first terminal sub-data structure, and the first terminal sub-data structure comprising a second intermediate identifier of the first intermediate sub-data structure; store a second hierarchical data structure comprising a second sequence of sub-data structures, the second sequence of sub-data structures comprising a second initial sub-data structure, a second intermediate sub-data structure, and a second terminal sub-data structure, the second initial sub-data structure comprising a first intermediate identifier of the second intermediate sub-data structure, the second intermediate sub-data structure comprising a first terminal identifier of the second terminal sub-data structure and a first initial identifier of the second initial sub-data structure, and the second terminal sub-data structure comprising a second intermediate identifier of the second intermediate sub-data structure; and link the first sequence of sub-data structures with the second sequence of sub-data structures.

B. Computing Environment

Having discussed specific embodiments of the present solution, it may be helpful to describe aspects of the operating environment as well as associated system components (e.g., hardware elements) in connection with the methods and systems described herein.

Figure 9A:
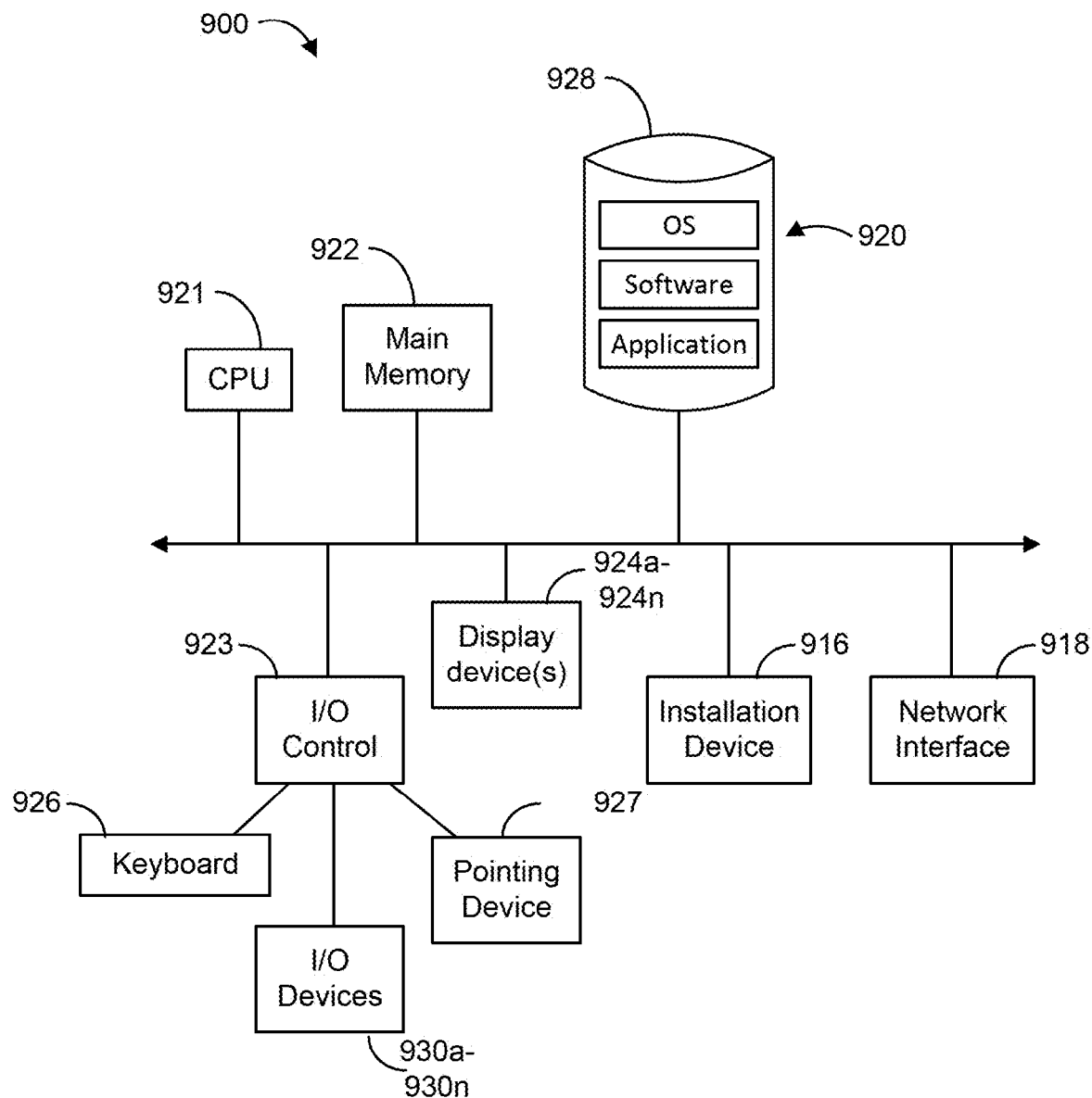
FIGS. 9A and 9B are block diagrams depicting embodiments of computing devices useful in connection with the methods and systems described herein.
Figure 9B:
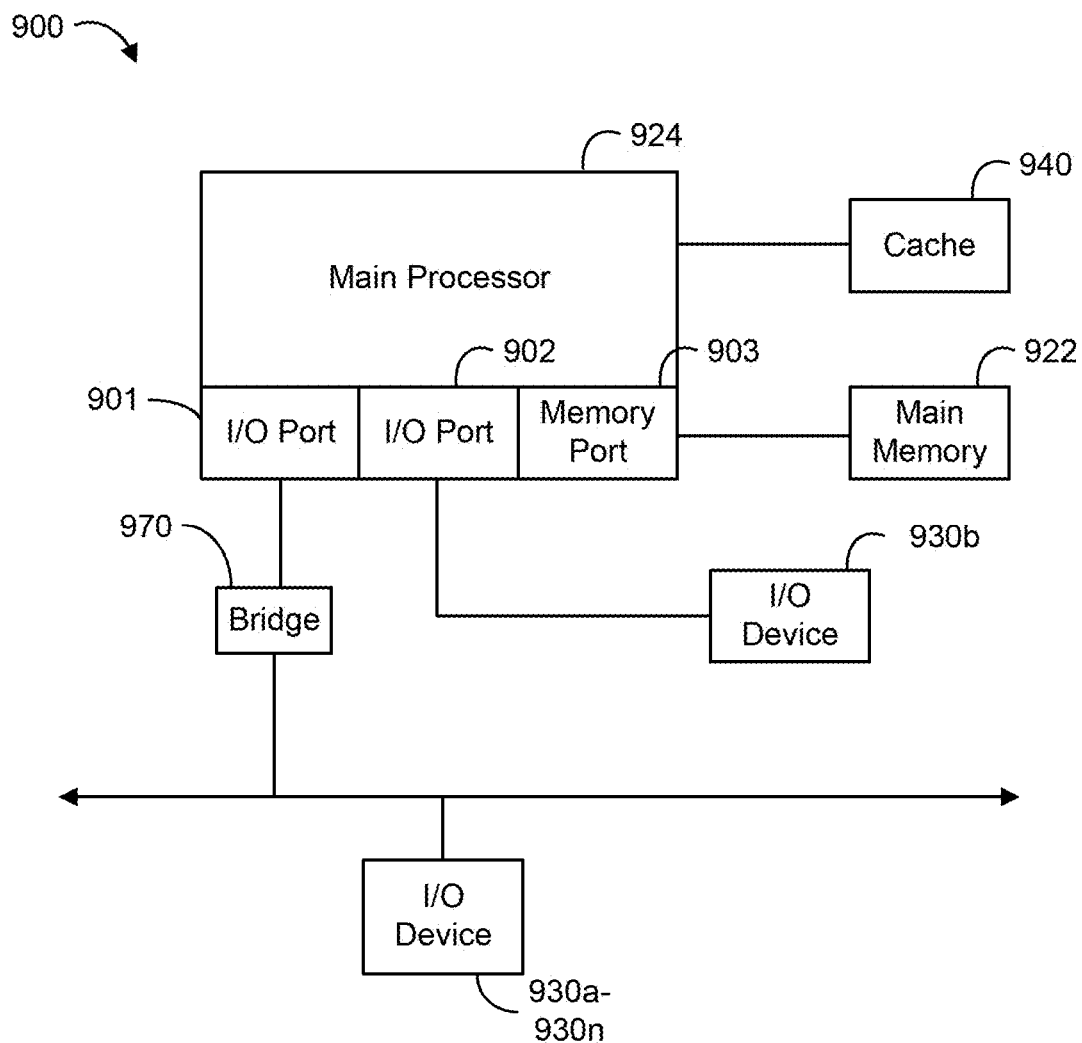

The systems discussed herein may be deployed as and/or executed on any type and form of computing device, such as a computer, network device or appliance capable of communicating on any type and form of network and performing the operations described herein. FIGS. 9A and 9B depict block diagrams of a computing device 900 useful for practicing an embodiment of the wireless communication devices 902 or the access point 906. As shown in FIGS. 9A and 9B, each computing device 900 includes a central processing unit 921, and a main memory unit 922. As shown in FIG. 9A, a computing device 900 may include a storage device 928, an installation device 916, a network interface 918, an I/O controller 923, display devices 924a-924n, a keyboard 926 and a pointing device 927, such as a mouse. The storage device 928 may include, without limitation, an operating system and/or software. As shown in FIG. 9B, each computing device 900 may also include additional optional elements, such as a memory port 903, a bridge 970, one or more input/output devices 930a-830n (generally referred to using reference numeral 930), and a cache memory 940 in communication with the central processing unit 921.

The central processing unit 921 is any logic circuitry that responds to and processes instructions fetched from the main memory unit 922. In many embodiments, the central processing unit 921 is provided by a microprocessor unit, such as: those manufactured by Intel Corporation of Mountain View, California; those manufactured by International Business Machines of White Plains, New York; or those manufactured by Advanced Micro Devices of Sunnyvale, California. The computing device 900 may be based on any of these processors, or any other processor capable of operating as described herein.

Main memory unit 922 may be one or more memory chips capable of storing data and allowing any storage location to be directly accessed by the microprocessor 921, such as any type or variant of Static random access memory (SRAM), Dynamic random access memory (DRAM), Ferroelectric RAM (FRAM), NAND Flash, NOR Flash and Solid State Drives (SSD). The main memory 922 may be based on any of the above described memory chips, or any other available memory chips capable of operating as described herein. In the embodiment shown in FIG. 9A, the processor 921 communicates with main memory 922 via a system bus 980 (described in more detail below). FIG. 9B depicts an embodiment of a computing device 900 in which the processor communicates directly with main memory 922 via a memory port 903. For example, in FIG. 9B the main memory 922 may be DRDRAM.

FIG. 9B depicts an embodiment in which the main processor 921 communicates directly with cache memory 940 via a secondary bus, sometimes referred to as a backside bus. In other embodiments, the main processor 921 communicates with cache memory 940 using the system bus 980. Cache memory 940 typically has a faster response time than main memory 922 and is provided by, for example, SRAM, BSRAM, or EDRAM. In the embodiment shown in FIG. 9B, the processor 921 communicates with various I/O devices 930 via a local system bus 980. Various buses may be used to connect the central processing unit 921 to any of the I/O devices 930, for example, a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 924, the processor 921 may use an Advanced Graphics Port (AGP) to communicate with the display 924. FIG. 9B depicts an embodiment of a computer 900 in which the main processor 921 may communicate directly with I/O device 930b, for example via HYPERTRANSPORT, RAPIDIO, or INFINIBAND communications technology. FIG. 9B also depicts an embodiment in which local busses and direct communication are mixed: the processor 921 communicates with I/O device 930a using a local interconnect bus while communicating with I/O device 930b directly.

A wide variety of I/O devices 930a-930n may be present in the computing device 900. Input devices include keyboards, mice, trackpads, trackballs, microphones, dials, touch pads, touch screen, and drawing tablets. Output devices include video displays, speakers, inkjet printers, laser printers, projectors and dye-sublimation printers. The I/O devices may be controlled by an I/O controller 923 as shown in FIG. 9A. The I/O controller may control one or more I/O devices such as a keyboard 926 and a pointing device 927, e.g., a mouse or optical pen. Furthermore, an I/O device may also provide storage and/or an installation medium 916 for the computing device 900. In still other embodiments, the computing device 900 may provide USB connections (not shown) to receive handheld USB storage devices such as the USB Flash Drive line of devices manufactured by Twintech Industry, Inc. of Los Alamitos, California.

Referring again to FIG. 9A, the computing device 900 may support any suitable installation device 916, such as a disk drive, a CD-ROM drive, a CD-R/RW drive, a DVD-ROM drive, a flash memory drive, tape drives of various formats, USB device, hard-drive, a network interface, or any other device suitable for installing software and programs. The computing device 900 may further include a storage device, such as one or more hard disk drives or redundant arrays of independent disks, for storing an operating system and other related software, and for storing application software programs such as any program or software 920 for implementing (e.g., configured and/or designed for) the systems and methods described herein. Optionally, any of the installation devices 916 could also be used as the storage device. Additionally, the operating system and the software can be run from a bootable medium.

Furthermore, the computing device 900 may include a network interface 918 to interface to the network 904 through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, IEEE 802.11ac, IEEE 802.11ad, CDMA, GSM, WiMax and direct asynchronous connections). In one embodiment, the computing device 900 communicates with other computing devices 900' via any type and/or form of gateway or tunneling protocol such as Secure Socket Layer (SSL) or Transport Layer Security (TLS). The network interface 918 may include a built-in network adapter, network interface card, PCMCIA network card, card bus network adapter, wireless network adapter, USB network adapter, modem or any other device suitable for interfacing the computing device 900 to any type of network capable of communication and performing the operations described herein.

In some implementations, the computing device 900 may include or be connected to one or more display devices 924a-924n. As such, any of the I/O devices 930a-930n and/or the I/O controller 923 may include any type and/or form of suitable hardware, software, or combination of hardware and software to support, enable or provide for the connection and use of the display device(s) 924a-924n by the computing device 900. For example, the computing device 900 may include any type and/or form of video adapter, video card, driver, and/or library to interface, communicate, connect or otherwise use the display device(s) 924a-924n. In one embodiment, a video adapter may include multiple connectors to interface to the display device(s) 924a-924n. In other embodiments, the computing device 900 may include multiple video adapters, with each video adapter connected to the display device(s) 924a-924n. In some implementations, any portion of the operating system of the computing device 900 may be configured for using multiple displays 924a-924n. One ordinarily skilled in the art will recognize and appreciate the various ways and embodiments that a computing device 900 may be configured to have one or more display devices 924a-924n.

In further embodiments, an I/O device 930 may be a bridge between the system bus 980 and an external communication bus, such as a USB bus, an Apple Desktop Bus, an RS-232 serial connection, a SCSI bus, a FireWire bus, a FireWire 500 bus, an Ethernet bus, an AppleTalk bus, a Gigabit Ethernet bus, an Asynchronous Transfer Mode bus, a FibreChannel bus, a Serial Attached small computer system interface bus, a USB connection, or a HDMI bus.

A computing device 900 of the sort depicted in FIGS. 9A and 9B may operate under the control of an operating system, which control scheduling of tasks and access to system resources. The computing device 900 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: Android, produced by Google Inc.; WINDOWS 7 and 8, produced by Microsoft Corporation of Redmond, Washington; MAC OS, produced by Apple Computer of Cupertino, California; WebOS, produced by Research In Motion (RIM); OS/2, produced by International Business Machines of Armonk, New York; and Linux, a freely-available operating system distributed by Caldera Corp. of Salt Lake City, Utah, or any type and/or form of a Unix operating system, among others.

The computer system 900 can be any workstation, telephone, desktop computer, laptop or notebook computer, server, handheld computer, mobile telephone or other portable telecommunications device, media playing device, a gaming system, mobile computing device, or any other type and/or form of computing, telecommunications or media device that is capable of communication. The computer system 900 has sufficient processor power and memory capacity to perform the operations described herein.

In some implementations, the computing device 900 may have different processors, operating systems, and input devices consistent with the device. For example, in one embodiment, the computing device 900 is a smart phone, mobile device, tablet or personal digital assistant. In still other embodiments, the computing device 900 is an Android-based mobile device, an iPhone smart phone manufactured by Apple Computer of Cupertino, California, or a Blackberry or WebOS-based handheld device or smart phone, such as the devices manufactured by Research In Motion Limited. Moreover, the computing device 900 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some implementations, on multiple machines in a distributed system. In addition, the systems and methods described above may be provided as one or more computer-readable programs or executable instructions embodied on or in one or more articles of manufacture. The article of manufacture may be a floppy disk, a hard disk, a CD-ROM, a flash memory card, a PROM, a RAM, a ROM, or a magnetic tape. In general, the computer-readable programs may be implemented in any programming language, such as LISP, PERL, C, C++, C #, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

What is claimed is:

1. A method for data storage and retrieval from a computer memory, comprising:

storing, by a computing device, a first hierarchical data structure comprising a first sequence of sub-data structures, the first sequence of sub-data structures comprising a first initial sub-data structure, a first at least one intermediate sub-data structure, and a first terminal sub-data structure, the first initial sub-data structure linked with the first at least one intermediate sub-data structure by an identifier of the at least one intermediate sub-data structure in the first initial sub-data structure and an identifier of the first initial sub-data structure in the first at least one intermediate sub-data structure, the first at least one intermediate sub-data structure linked with the first terminal sub-data structure by an identifier of the first terminal sub-data structure in the first at least one intermediate sub-data structure and an identifier of the first at least one intermediate sub-data structure in the first terminal sub-data structure, wherein the first initial sub-data structure comprises course data about a course and the first terminal sub-data structure comprises activity data about an activity for the course, the activity data comprising an activity time on task estimate and the course data about the course comprising a course time on task estimate comprising an aggregate of activity time on task estimates of the first terminal sub-data structure and any other terminal sub-data structures comprising the identifier of the first initial sub-data structure in the first hierarchical data structure;

storing, by the computing device, a second hierarchical data structure comprising a second sequence of sub-data structures, the second sequence of sub-data structures comprising a second initial sub-data structure, a second at least one intermediate sub-data structure, and a second terminal sub-data structure, the second initial sub-data structure linked with the second at least one intermediate sub-data structure by an identifier of the at least one intermediate sub-data structure in the second initial sub-data structure and an identifier of the second initial sub-data structure in the second at least one intermediate sub-data structure, the second at least one intermediate sub-data structure linked with the second terminal sub-data structure by an identifier of the second terminal sub-data structure in the second at least one intermediate sub-data structure and an identifier of the second at least one intermediate sub-data structure in the second terminal sub-data structure, wherein the second initial sub-data structure comprises program outcome data for a program and the second terminal sub-data structure comprises module outcome data for a module of the program, the module outcome data comprising an aggregation of activity time on task estimates of a second plurality of terminal sub-data structures in the first hierarchical data structure linked to the second terminal sub-data structure, the program outcome data comprising an aggregation of module outcome time on task estimates of a second plurality of terminal sub-data structures of the second hierarchical data structure linked to the second initial sub-data structure;

inserting, by the computing device, a terminal identifier of the second terminal sub-data structure into a first field of the first terminal sub-data structure and a terminal identifier of the first terminal sub-data structure into a second field the second terminal sub-data structure, the first and second fields each dedicated to storing identifiers of sub-data structures;

receiving, by the computing device from a client device, a request comprising an identification of the first initial sub-data structure of the first sequence;

responsive to receipt of the request, retrieving, by the computing device, data from each sub-data structure in the first sequence of sub-data structures and the second sequence of sub-data structures based on the identification of the first initial sub-data structure matching a string in the first initial sub-data structure of the first sequence and further based on each identifier linking the first sequence of sub-data structures and the second sequence of sub-data structures and the first terminal sub-data structure with the second terminal sub-data structure;

and transmitting, by the computing device, a record generated based on the retrieved data to the client device.

2. The method of claim 1, comprising:
receiving, by the computing device, a second request comprising the identification of the first initial sub-data structure, the second request to update the first sequence of sub-data structure;
retrieving, by the computing device and based on the identification of the first initial sub-data structure in the second request, data from each sub-data structure in the second sequence of sub-data structures based on the identifiers linking the first terminal sub-data structure with the second terminal sub-data structure; and
storing, by the computing device, the retrieved data or data generated from the second sequence of sub-data structures in corresponding sub-data structures of the first sequence of sub-data structures.

3. The method of claim 1, further comprising:
storing, by the computing device, a third sequence of sub-data structures in the first hierarchical data structure, the third sequence of sub-data structures comprising the first initial sub-data structure, the first at least one intermediate sub-data structure, and a third terminal sub-data structure, the first at least one intermediate sub-data structure linked with the third terminal sub-data structure;
storing, by the computing device, a fourth sequence of sub-data structures in the second hierarchical data structure, the fourth sequence of sub-data structures comprising a third initial sub-data structure, a third at least one intermediate sub-data structure, and a fourth terminal sub-data structure, the third at least one intermediate sub-data structure further linked with the fourth terminal sub-data structure; and
linking, by the computing device, the third sequence of sub-data structures and the fourth sequence of sub-data structures.

4. The method of claim 1, comprising:
identifying, by the computing device, the first initial sub-data structure in response to the request; and
responsive to identifying the first initial sub-data structure, identifying, by the computing device, the first terminal initial sub-data structure based on the link between the first initial sub-data structure and the first at least one intermediate sub-data structure and the link between the first at least one intermediate sub-data structure and the first terminal sub-data structure.

5. The method of claim 4, comprising:
identifying, by the computing device, the second terminal sub-data structure based on the link between the first terminal sub-data structure and the second terminal sub-data structure; and
responsive to identifying the second terminal sub-data structure, identifying, by the computing device, the second initial sub-data structure based on the link between the second terminal sub-data structure and the second at least one intermediate sub-data structure and the link between the second at least one intermediate sub-data structure and the second initial sub-data structure.

6. The method of claim 1, further comprising:
storing, by the computing device, the data within each of the sub-data structures in the first sequence of sub-data structures and in the second sequence of sub-data structures.

7. The method of claim 1, further comprising:
storing, by the computing device, a third sequence of sub-data structures in the first hierarchical data structure and a fourth sequence of sub-data structures in the second hierarchical data structure; and
responsive to a sub-data structure of the fourth sequence of sub-data structures not including an identifier for any child sub-data structure, inserting, by the computing device, an identifier of the sub-data structure of the fourth sequence of sub-data structures into a third terminal sub-data structure of the third sequence of sub-data structures.

8. The method of claim 1, wherein the first at least one intermediate sub-data structure comprises module data about a module for the course, the module data comprising a module time on task estimate comprising an aggregate of activity time on task estimates of a plurality of terminal sub-data structures linked to the first at least one intermediate sub-data structure; and wherein the second at least one intermediate sub-data structure comprises course outcome data for the course, the course outcome data comprising an aggregate of module outcome time on task estimates of a second plurality of terminal sub-data structures of the second hierarchical data structure linked to the second at least one intermediate sub-data structure.

9. The method of claim 1, further comprising:
adding, by the computing device, a third terminal sub-data structure to the first hierarchical data structure, the third terminal sub-data structure comprising a second activity time on task estimate and linked with the first initial sub-data structure; and responsive to the adding the third terminal sub-data structure to the first hierarchical data structure, updating the course time on task estimate with the second activity time on task estimate based on the link between the third terminal sub-data structure and the first initial sub-data structure.

10. The method of claim 1, further comprising:
receiving, by the computing device, a data file comprising a plurality of columns, the plurality of columns comprising a module name column, an activity name in an activity name column, and a time on task estimate column;
determining, by the computing device, there are not any terminal sub-data structures that match the activity name; and
responsive to the determining, generating, by the computing device, a third terminal sub-data structure comprising the intermediate sub-data structure identifier linked with the first at least one intermediate sub-data structure of the first sequence of sub-data structures responsive to the first at least one intermediate sub-data structure comprising a string that matches a module name in the data file, the first at least one intermediate sub-data structure linked between the first initial sub-data structure and the first terminal sub-data structure.

11. The method of claim 1, further comprising:
storing, by the computing device, a local outcome set identifier in the second initial sub-data structure of the second hierarchical data structure;
receiving, by the computing device from a user account being accessed by a second client device, a request to view data from the second initial sub-data structure;
determining, by the computing device, the user account has permission to view the second initial sub-data structure based on the local outcome set identifier; and
provisioning, by the computing device, the data from the second initial sub-data structure to the user account responsive to the determination that the user account has permission to view the second hierarchical data structure.

12. A system for data storage and retrieval from a computer memory, comprising:
a computing device comprising a processor and a memory, the processor configured to execute instructions stored in the memory to:
store a first hierarchical data structure comprising a first sequence of sub-data structures, the first sequence of sub-data structures comprising a first initial sub-data structure, a first at least one intermediate sub-data structure, and a first terminal sub-data structure, the first initial sub-data structure linked with the first at least one intermediate sub-data structure by an identifier of the at least one intermediate sub-data structure in the first initial sub-data structure and an identifier of the first initial sub-data structure in the first at least one intermediate sub-data structure, the first at least one intermediate sub-data structure linked with the first terminal sub-data structure by an identifier of the first terminal sub-data structure in the first at least one intermediate sub-data structure and an identifier of the first at least one intermediate sub-data structure in the first terminal sub-data structure, wherein the first initial sub-data structure comprises course data about a course and the first terminal sub-data structure comprises activity data about an activity for the course, the activity data comprising an activity time on task estimate and the course data about the course comprising a course time on task estimate comprising an aggregate of activity time on task estimates of the first terminal sub-data structure and any other terminal sub-data structures comprising the identifier of the first initial sub-data structure in the first hierarchical data structure;
store a second hierarchical data structure comprising a second sequence of sub-data structures, the second sequence of sub-data structures comprising a second initial sub-data structure, a second at least one intermediate sub-data structure, and a second terminal sub-data structure, the second initial sub-data structure linked with the second at least one intermediate sub-data structure by an identifier of the at least one intermediate sub-data structure in the second initial sub-data structure and an identifier of the second initial sub-data structure in the second at least one intermediate sub-data structure, the second at least one intermediate sub-data structure linked with the second terminal sub-data structure by an identifier of the second terminal sub-data structure in the second at least one intermediate sub-data structure and an identifier of the second at least one intermediate sub-data structure in the second terminal sub-data structure, wherein the second initial sub-data structure comprises program outcome data for a program and the second terminal sub-data structure comprises module outcome data for a module of the program, the module outcome data comprising an aggregation of activity time on task estimates of a second plurality of terminal sub-data structures in the first hierarchical data structure linked to the second terminal sub-data structure, the program outcome data comprising an aggregation of module outcome time on task estimates of a second plurality of terminal sub-data structures of the second hierarchical data structure linked to the second initial sub-data structure;
insert a terminal identifier of the second terminal sub-data structure into a first field of the first terminal sub-data structure and a terminal identifier of the first terminal sub-data structure into a second field the second terminal sub-data structure, the first and second fields each dedicated to storing identifiers of sub-data structures;
receive, from a client device, a request comprising an identification of the first initial sub-data structure for the first sequence;
responsive to receipt of the request, retrieve data from each sub-data structure in the first sequence of sub-data structures and the second sequence of sub-data structures based on the identification of the first initial sub-data structure matching a string in the first initial sub-data structure of the first sequence and further based on each identifier linking the first sequence of sub-data structures and the second sequence of sub-data structures and the first terminal sub-data structure with the second terminal sub-data structure;
responsive to the identification, retrieve data from each identified sub-data structure in the first sequence of sub-data structures and in the second sequence of sub-data structures; and
transmit a record generated based on the retrieved data to the client device.

13. A system for data storage and retrieval from a computer memory, comprising:

a computing device comprising a processor and a memory, the processor configured to execute instructions stored in the memory to:
  store a first hierarchical data structure comprising a first sequence of sub-data structures, the first sequence of sub-data structures comprising a first initial sub-data structure and a first terminal sub-data structure, the first initial sub-data structure linked with the first terminal sub-data structure;
  store a second hierarchical data structure comprising a second sequence of sub-data structures, the second sequence of sub-data structures comprising a second initial sub-data structure and a second terminal sub-data structure, the second initial sub-data structure linked with the second terminal sub-data structure;
  insert a terminal identifier of the second terminal sub-data structure into a first field of the first terminal sub-data structure and a terminal identifier of the first terminal sub-data structure into a second field the second terminal sub-data structure, the first and second fields each dedicated to storing identifiers of sub-data structures;
  receive a data file comprising a plurality of columns, the plurality of columns comprising a module name column, an activity name in an activity name column, and a time on task estimate column;
  determine there are not any terminal sub-data structures that match the activity name; and
  responsive to the determination, generate a third terminal sub-data structure comprising an intermediate sub-data structure identifier linked with a first intermediate sub-data structure of the first sequence of sub-data structures responsive to the first intermediate sub-data structure comprising a string that matches a module name in the data file, the first intermediate sub-data structure linked between the first initial sub-data structure and the first terminal sub-data structure.

14. The system of claim 13, wherein the processor is further configured to:
  receive a second request comprising an identification of the first initial sub-data structure;
  retrieve, based on the identification of the first initial sub-data structure, data from each sub-data structure in the second sequence of sub-data structures based on the link between the first terminal sub-data structure and the second terminal sub-data structure; and
  store the retrieved data or data generated from the second sequence of sub-data structures in corresponding sub-data structures of the first sequence of sub-data structures.

15. The system of claim 13, wherein the processor is further configured to:
  link the first initial sub-data structure with the first terminal sub-data structure by linking the first initial sub-data structure to a first intermediate sub-data structure and linking the first intermediate sub-data structure with the first terminal sub-data structure; and
  link the second initial sub-data structure with the second terminal sub-data structure by linking the second initial sub-data structure to a second intermediate sub-data structure and linking the second intermediate sub-data structure with the second terminal sub-data structure.

\* \* \* \* \*